(12) United States Patent
Ford

(10) Patent No.: US 7,934,670 B2
(45) Date of Patent: May 3, 2011

(54) REMOVABLE HOPPER GRINDER

(75) Inventor: David F. Ford, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 833 days.

(21) Appl. No.: 10/553,978

(22) PCT Filed: Apr. 23, 2004

(86) PCT No.: PCT/US2004/013102
§ 371 (c)(1),
(2), (4) Date: Nov. 13, 2006

(87) PCT Pub. No.: WO2004/098361
PCT Pub. Date: Nov. 18, 2004

(65) Prior Publication Data
US 2007/0063079 A1   Mar. 22, 2007

Related U.S. Application Data

(60) Provisional application No. 60/464,717, filed on Apr. 23, 2003.

(51) Int. Cl.
*B02C 19/00* (2006.01)
(52) U.S. Cl. ......... 241/30; 222/23; 222/132; 222/145.1; 222/179.5; 222/501; 241/100; 241/285.2
(58) Field of Classification Search .................. 177/205; 222/23, 132, 145.1, 179.5, 501; 241/3, 100, 241/285.2, 30
See application file for complete search history.

(56) References Cited

U.S. PATENT DOCUMENTS

| | | |
|---|---|---|
| 1,141,898 A | 6/1915 | Merritt |
| 2,090,634 A | 8/1937 | Meeker |
| 2,229,031 A | 12/1937 | Anderson et al. |
| 2,138,204 A | 11/1938 | Rable |
| 3,744,729 A | 7/1973 | Ackerman |
| 4,789,106 A | 12/1988 | Weber |
| 4,947,946 A | 8/1990 | Konishi et al. |

(Continued)

FOREIGN PATENT DOCUMENTS
WO    WO 97/41763    11/1997

(Continued)

OTHER PUBLICATIONS

International Search Report for International Application No. PCT/US2004/013102, International Filing Date Apr. 23, 2004. ISR completion date Aug. 24, 2004, Date of Mailing Oct. 12, 2004.

*Primary Examiner* — Mark Rosenbaum
(74) *Attorney, Agent, or Firm* — Barnes & Thornburg LLP

(57) ABSTRACT

A grinding machine (20) for use in grinding materials, the grinding machine (20) comprising: a grinder assembly (22) for receiving material therein; at least one removable hopper (24) attachable proximate to the grinding assembly (22) for dispensing material to the grinder assembly (22); a passage (22) defined in the hopper being cooperatively placed in communication with the grinding assembly (22) for dispensing material from the hopper (24) to the grinder assembly (22); a displaceable shutter (70) being positionnable in an open position when the hopper (24) is placed on the grinder assembly (22) and being positionnable in a closed position when the hopper (24) is removed from the grinder assembly (22); and a slide gate mechanism (42) including a slide gate (42) and a mover linked to the slide gate for controllably opening and closing passage of material from the hopper (24) to the grinder assembly (22) for grinfind material therein.

19 Claims, 20 Drawing Sheets

U.S. PATENT DOCUMENTS

| | | |
|---|---|---|
| 4,967,649 A | 11/1990 | Ephraim et al. |
| 4,971,259 A | 11/1990 | Nidiffer |
| 5,186,399 A | 2/1993 | Knepler et al. |
| 5,386,944 A | 2/1995 | Knepler et al. |
| 5,465,650 A | 11/1995 | Friedrich et al. |
| 5,671,657 A | 9/1997 | Ford et al. |
| 5,718,163 A | 2/1998 | Termini |
| 6,057,514 A | 5/2000 | Maguire |
| 6,298,769 B1 | 10/2001 | Stettes et al. |
| 6,626,085 B1 | 9/2003 | Lassota |
| 2002/0113080 A1 | 8/2002 | Beal et al. |

FOREIGN PATENT DOCUMENTS

| | | |
|---|---|---|
| WO | WO 00/65969 | 11/2000 |

REMOVABLE HOPPER GRINDER

CROSS-REFERENCE TO RELATED PATENT APPLICATION

This patent application claims the benefit of U.S. Provisional Patent Application No. 60/464,717, filed Apr. 23, 2003. The disclosure set forth in the referenced provisional application is incorporated herein by reference in its entirety, including all information as originally submitted to the United States Patent and Trademark Office.

BACKGROUND

A variety of grinding devices, grinding machines or grinders have been developed for use in grinding materials such as coffee beans. An example of such a grinding device is a G9 grinder as produced by Bunn-O-Matic Corporation of Springfield, Illinois, assignee of the present application. Such grinding devices include one or more hoppers positioned above a grinder assembly for generally providing a gravity feed flow from the hopper into the grinder assembly. A brewing funnel or other container can be positioned below the grinder assembly so as to catch the ground coffee dispensed from the grinder assembly.

Such grinding machines may grind a desired amount of coffee based on a timer-controlled grinding method such as is disclosed in U.S. Pat. No. 4,971,259, issued Nov. 20, 1990 to Nidiffer and assigned to Bunn-O-Matic Corporation, assignee of the present application. The grinder shown in Nidiffer '259 includes slide gates which are positioned between an outlet or passage of the bean hopper and the corresponding inlet to the grinder assembly. In one embodiment, the slide gate is connected to a controllable solenoid which shifts the slide gate from a closed position, covering the outlet from the bean hopper, to an open position opening the outlet to the bean hopper. When the slide gate is in the closed position beans are not allowed to flow from the hopper to the grinder assembly. When the solenoid shifts the slide gate to the open position an aperture in the slide gate aligns with the outlet of the hopper and the inlet of the grinder, beans are allowed from flow from the hopper to the grinder. A controller is provided and coupled to the controllable solenoid so as to operate the solenoid to shift the slide gate into the open position for a predetermined period of time. The predetermine period of time corresponds to a quantity of beans which will flow from the hopper to the grinder.

Another type of grinder has been developed which measures the weight of the ground coffee expelled from the grinder assembly. Such a grinder is disclosed in U.S. Pat. No. 5,386,944 issued Feb. 7, 1995 to Knepler et al., and assigned to Bunn-O-Matic Corporation, assignee of the present application. The Knepler '944 patent discloses using a weight sensor to provide a weight signal. The weight signal is monitored and the grinder assembly is controlled to stop or continue grinding, at least in part, in response to the weight signal. One embodiment of the device as disclosed in Knepler '944 controls the dispensing of the beans into the grinder assembly in response to the weight sensed by the weight sensor. The disclosure in Knepler '944 also provides for an "over-grind "time in which the grinder can be operated for an additional period of time after the dispensing of the beans has ceased so as to clean out the grinder assembly of the beans being ground during the grinding cycle.

Additionally, a variety of coffee bean grinding devices have been developed which include hoppers which are removable from the grinding device. An example might be the variety of coffee bean grinding devices used to grind coffee such as produced by Pavoni and Marcuzzi. These grinders include removable hoppers with devices at the outlet of the hopper which close or stop the bean flow from the hopper when removed. These hoppers are designed to be removable to facilitate cleaning, changing of bean types stored in a variety of hoppers, and removal of beans for storage in a separate location when not in use.

Additional features will become apparent to those skilled in the art upon consideration of the following detailed description of drawings.

BRIEF DESCRIPTION OF THE DRAWINGS

The detailed description particularly refers to the accompanying figures in which.

DETAILED DESCRIPTION

Figure 1:
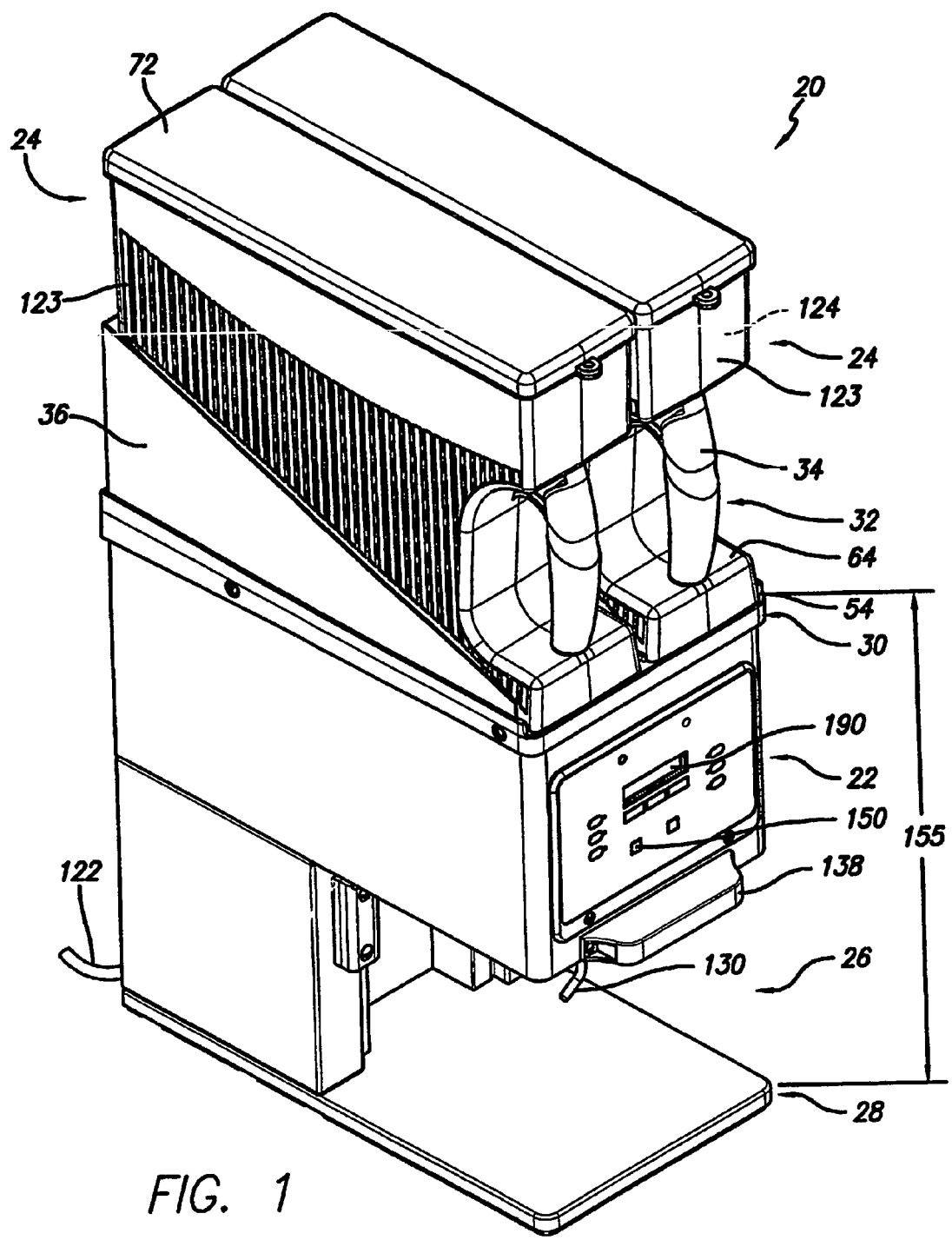
FIG. 1 is a perspective view of an embodiment of a coffee grinding machine including two hoppers which are positioned on top of a grinder assembly.
Figure 2:
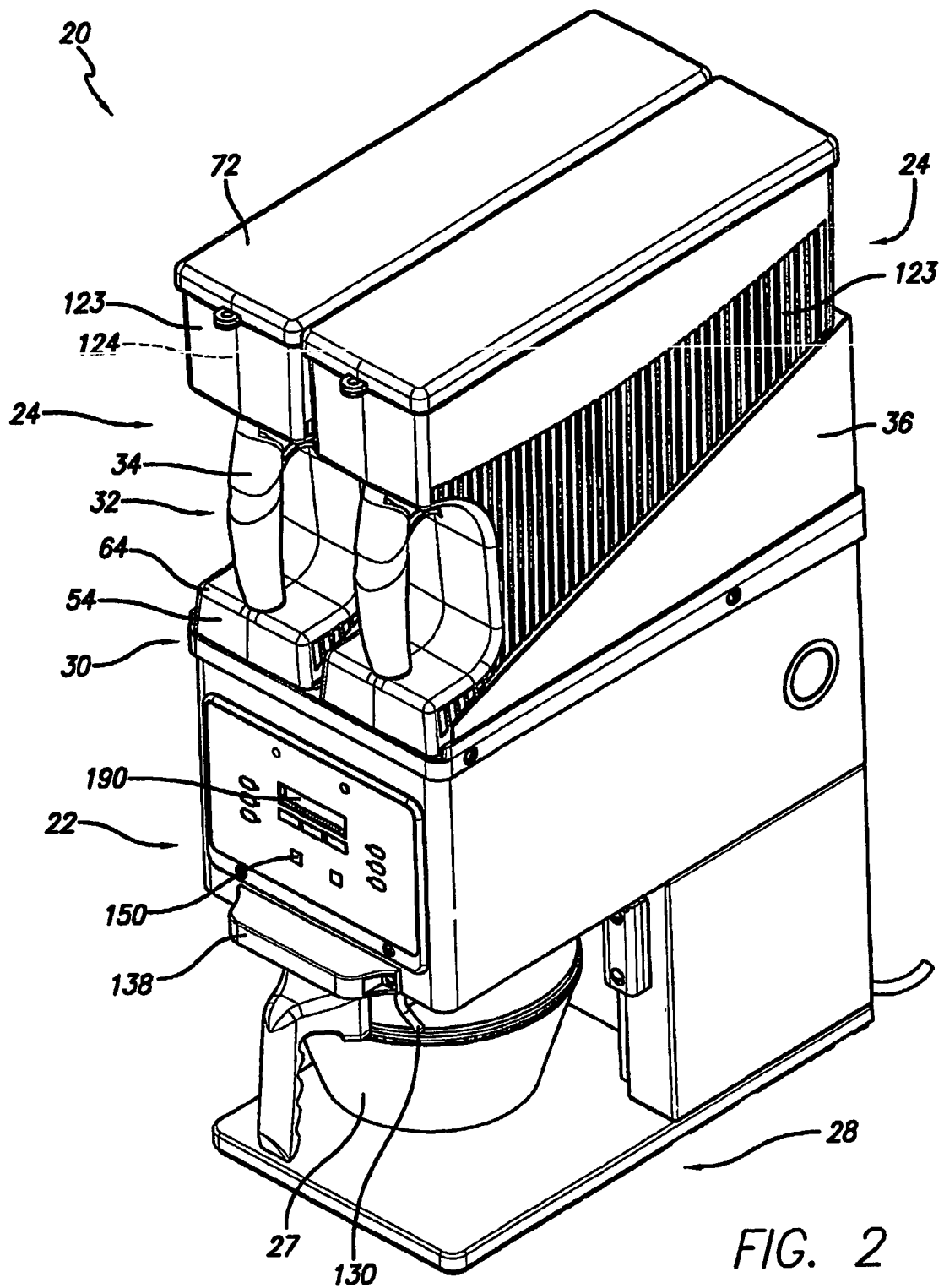
FIG. 2 is a perspective view of the coffee grinding machine shown in FIG. 1 viewed from a side angle.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or. to limit the disclosure to the details of construction and the arrangements of components set forth in the following description or illustrated in the drawings.

As shown in FIG. 1, a grinding machine or grinder 20 is shown. The grinding machine 20 has a grinder assembly 22 or a substance dispensing control unit of generally known construction for receiving coffee beans in a generally gravity feed flow from one or more hoppers 24 positioned thereabove. An example of such a grinder assembly 22 is the Bunn-O-Matic G9 grinder manufactured by Bunn-O-Matic Corporation, Springfield, Ill. assignee of the present invention. Information relating to the G9 grinder is incorporated herein by reference. Generally, the grinder assembly 22 includes a funnel holder 26 positioned below the grinder assembly 22 in which a funnel 27 is retained for receiving ground coffee from the grinder assembly 22. A base or foot 28 is provided at the bottom of the grinder assembly 22.

Containers other than a funnel 27 may be placed below the grinder assembly 22 proximate the base or foot 28 to collect coffee ground by the grinder. For example, other devices such as storage containers, bags, French press pots or containers and other forms of containers may be placed below the grinder assembly 22 to catch ground coffee. Reference herein to a funnel is not intended to limit the use of the grinder in combination with a funnel, to the contrary, all versions in which the grinder might produce ground coffee are envisioned in the present application.

Additionally, while reference is made to "ground coffee" and "coffee beans,"it is envisioned that the grinding machine 20 as disclosed herein can be used to grind any form of material including other substances for producing beverages or food products, and any other device in which a grinding or dispensing operation may occur and which the structures, systems and methods of operation of the grinding machine, as disclosed herein, might be used. Further, while a grinder is disclosed in detail herein it is envisioned that many of the systems, apparatus and methods of operation disclosed herein will apply to the use of the system as a dispenser and as such the disclosure is not restricted to grinders. Rather, the disclosure is intended to be broadly interpreted to include dispensers generally.

As shown, grinding machine 20 including the grinder assembly is designed for positioning the hoppers 24 on an open top assembly 30. The hoppers 24 positioned on the open top assembly 30 include a handle 32. As illustrated, the handle 32 has a body portion 34 which is sufficiently large to permit a user to grip the handle body 34 generally with all five fingers of the user's hand. Handle 32 is sized and dimensioned to provide convenient and sure gripping of the hopper 24 from which it extends. This helps to assure a positive grip and ease of use when placing or positioning the hoppers 24 on the open top assembly 30 and displacing or removing them from the open top assembly 30.

The hoppers 24 are generally formed of a transparent material such as plastic. While a portion of the hoppers may be formed of an opaque material, the hoppers 24 as shown in the figures herein are formed of a transparent material. The transparency of the hoppers generally on all sides thereof is desirable to allow an operator to see the level of material or beans in the hoppers. Additionally, there is value in the merchandising of fresh ground and fresh brewed coffee to showing the customers the fresh coffee beans. In this regard, the grinding machine 20 does not include a housing enclosing the hoppers. While a cosmetic shield 36 may be provided on the grinder assembly 22, the hoppers are not retained in this shield and as such are not positioned in any form of housing. The cosmetic shield may or may not be used with the hoppers 24 depending on cosmetic preferences. The hoppers 24 are positioned on the open top assembly 30 as will be described below.

Figure 6:
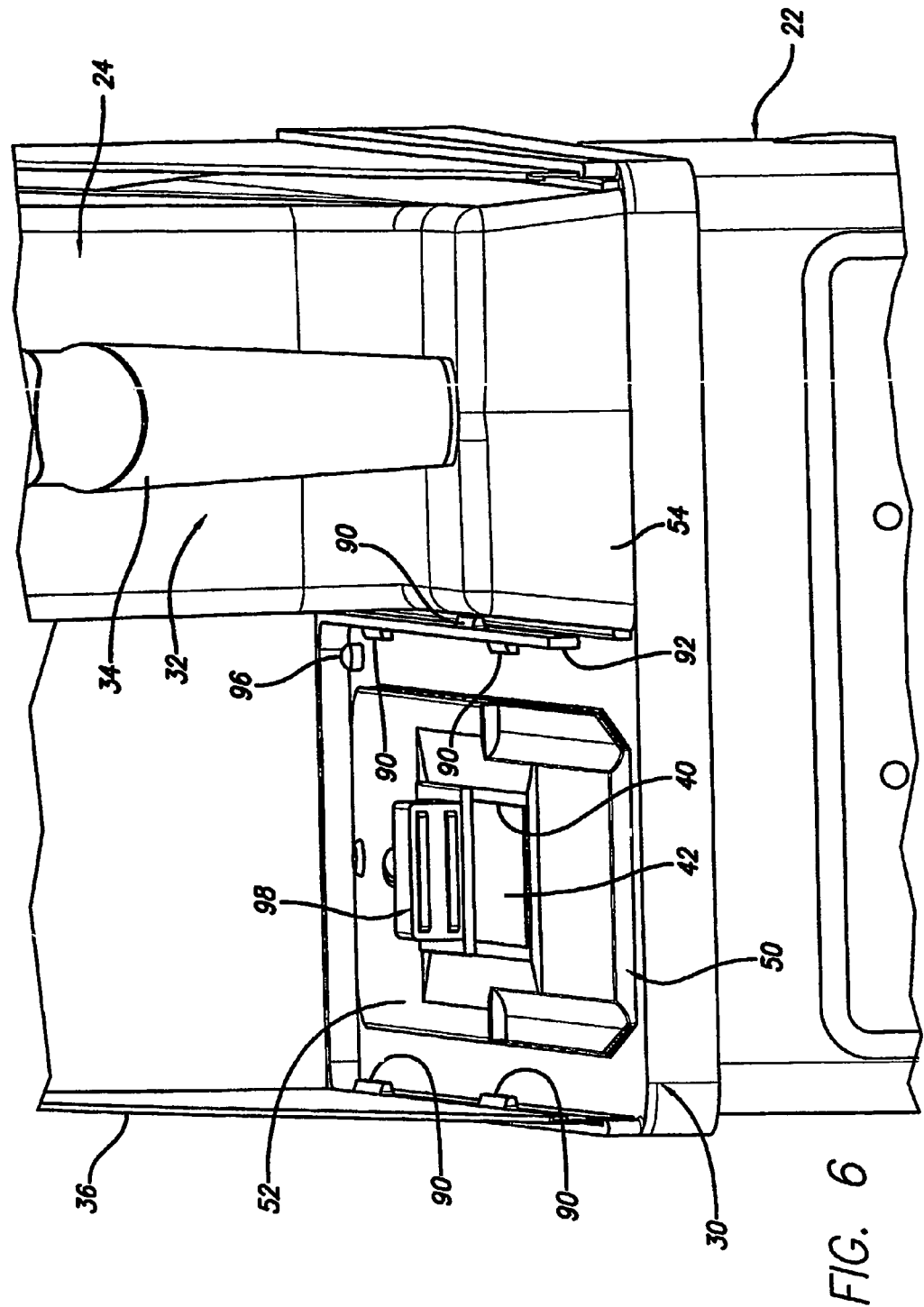
FIG. 6 is an enlarged front perspective view of the open top assembly of the grinder assembly with one hopper removed to show a cleat area and associated features on top of the grinder assembly.
Figure 7:
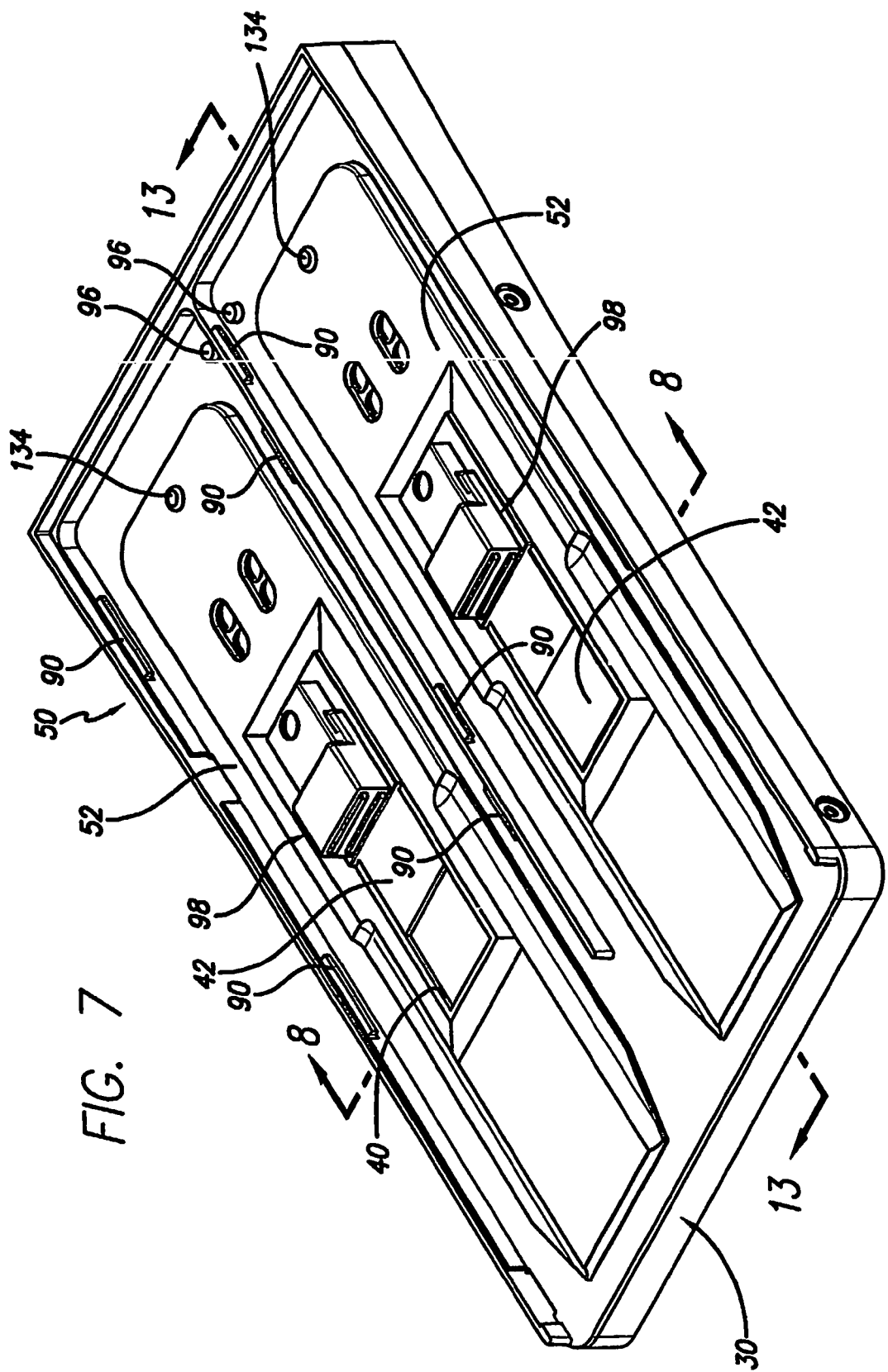
FIG. 7 is an enlarged perspective view of the cleat area with the hoppers removed and showing a pair of slide gate mechanisms, one for each hopper to be positioned thereon, and in which one slide gate is open and one slide gate is closed.

As briefly described above, grinding machine 20 includes one or more hoppers 24 positioned on the open top assembly 30. The open top assembly 30 as shown in FIG. 6 allows for a wide open front access to the top assembly 30. This facilitates thorough and easy removal of material from the top assembly without obstruction. As will be described in more detail below, a grinder inlet 40 is positioned on the top open assembly 30. The inlet 40 is closed by a controllable slide gate 42 which is controlled by a mechanically attached controllable solenoid 44 (see FIG. 9). The solenoid 44 is attached to the slide gate 42 by means of a connection, such as an armature or link 46. This is generally the construction of the hopper slide gate system disclosed in U.S. Pat. Nos. 4,971,259 and 5,671, 657 assigned to the assignee of the present invention, and both of which are incorporated herein by reference in their entirety. While a solenoid 44 is shown and illustrated herein, it is envisioned that other forms of moving or control devices may be attached to the slide gate 42 for movement of the slide gate relative to the grinder inlet 40. For example, controllable motors, controllable pneumatic or hydraulic controllers and other forms of moving devices may be used in combination with the slide gate 42. It is envisioned that these types of devices connected to the slide gate are fully within the scope of the disclosure.

Figure 8:
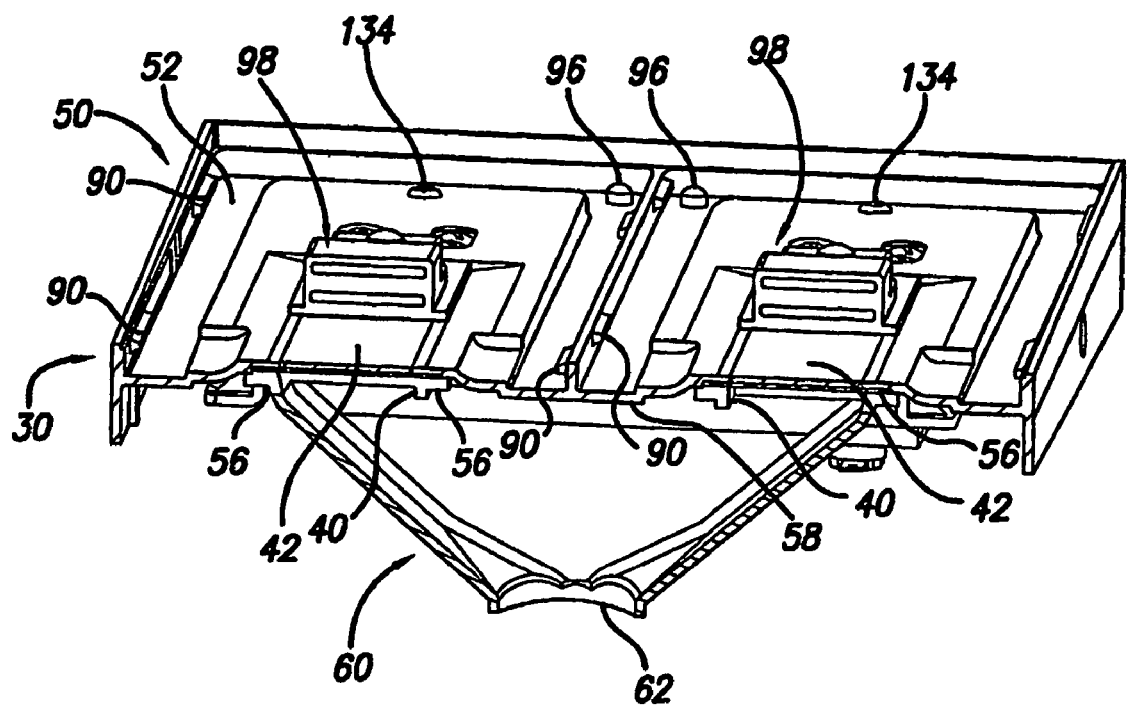
FIG. 8 is an enlarged, partial fragmentary, cross-sectional view taken along 8-8 in FIG. 7 showing elements of the cleat area as well as a shared dispensing chute below the hopper slide gates.
Figure 9:
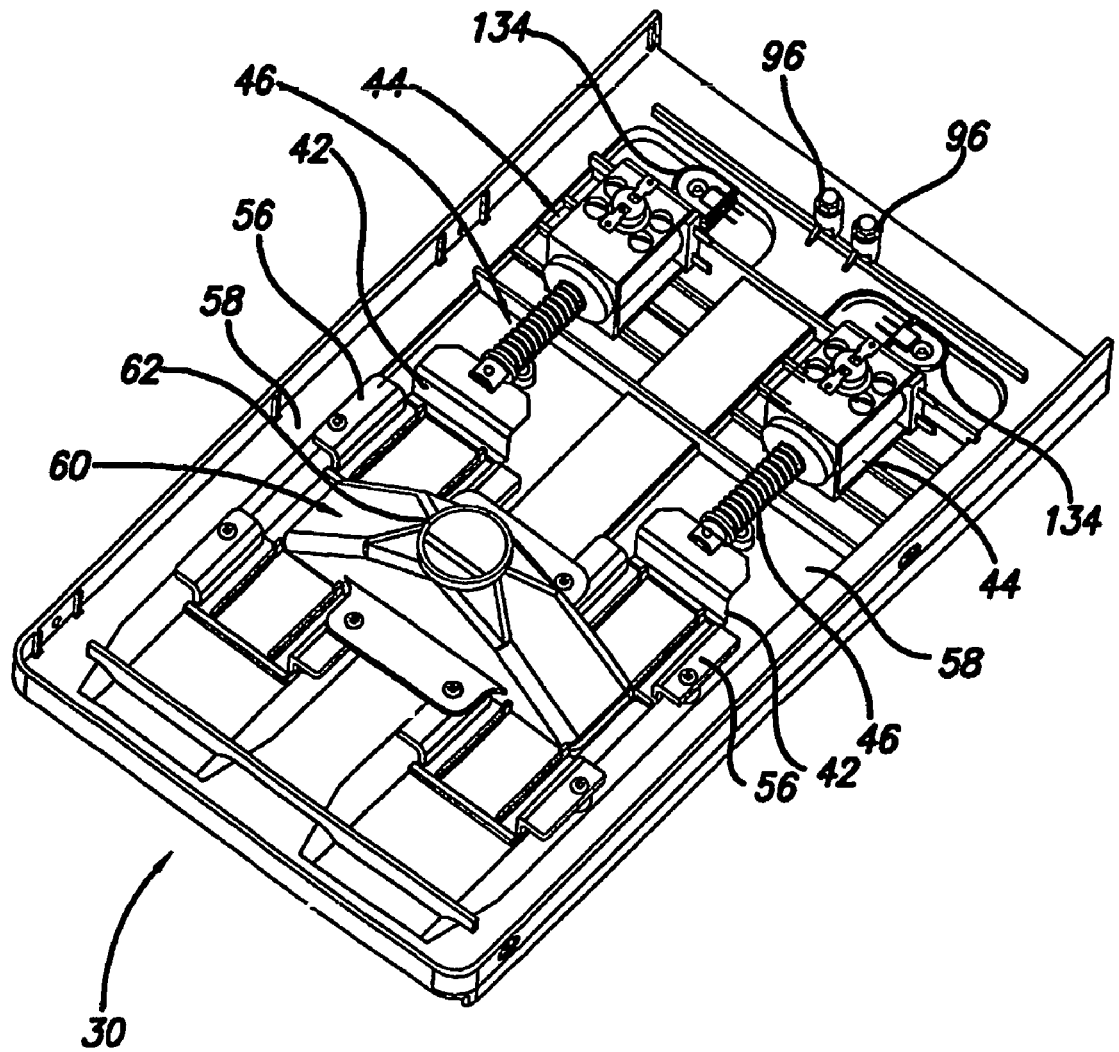
FIG. 9 is a bottom perspective view of an open top assembly shown in FIG. 7 and showing the connection of controllable movers or solenoids to the slide gates.

With reference to FIGS. 6-9, the open top assembly 30 includes a pair of cleat areas 50. The cleat areas 50 include an open face surface 52 upon which a bottom portion or edge 54 of the hoppers are placed. The open face surface 52 includes the grinder inlets 40 extending therethrough. As shown in FIGS. 8 and 9, channel structures 56 are provided and mounted to an underside surface 58 of the top assembly 30. The channel structures 56 receive and guide the slide gate 42 in movement relative to the grinder inlet 40. When open (see the left side of FIG. 6) the slide gate 42 is displaced by the solenoid 44 to open the inlet 40 between the hopper and a bean receiving chute 60 therebelow (see FIG. 8). When the slide gate 42 is in the closed position (see the right side of FIG. 6) beans are not permitted to flow from the hopper 24 to the chute 60. The chute 60 includes an outlet 62 which communicates with a bean grinding mechanism which is shown in U.S. Pat. No. 4,971,259 and is of known construction and is incorporated herein by reference.

Figure 10:
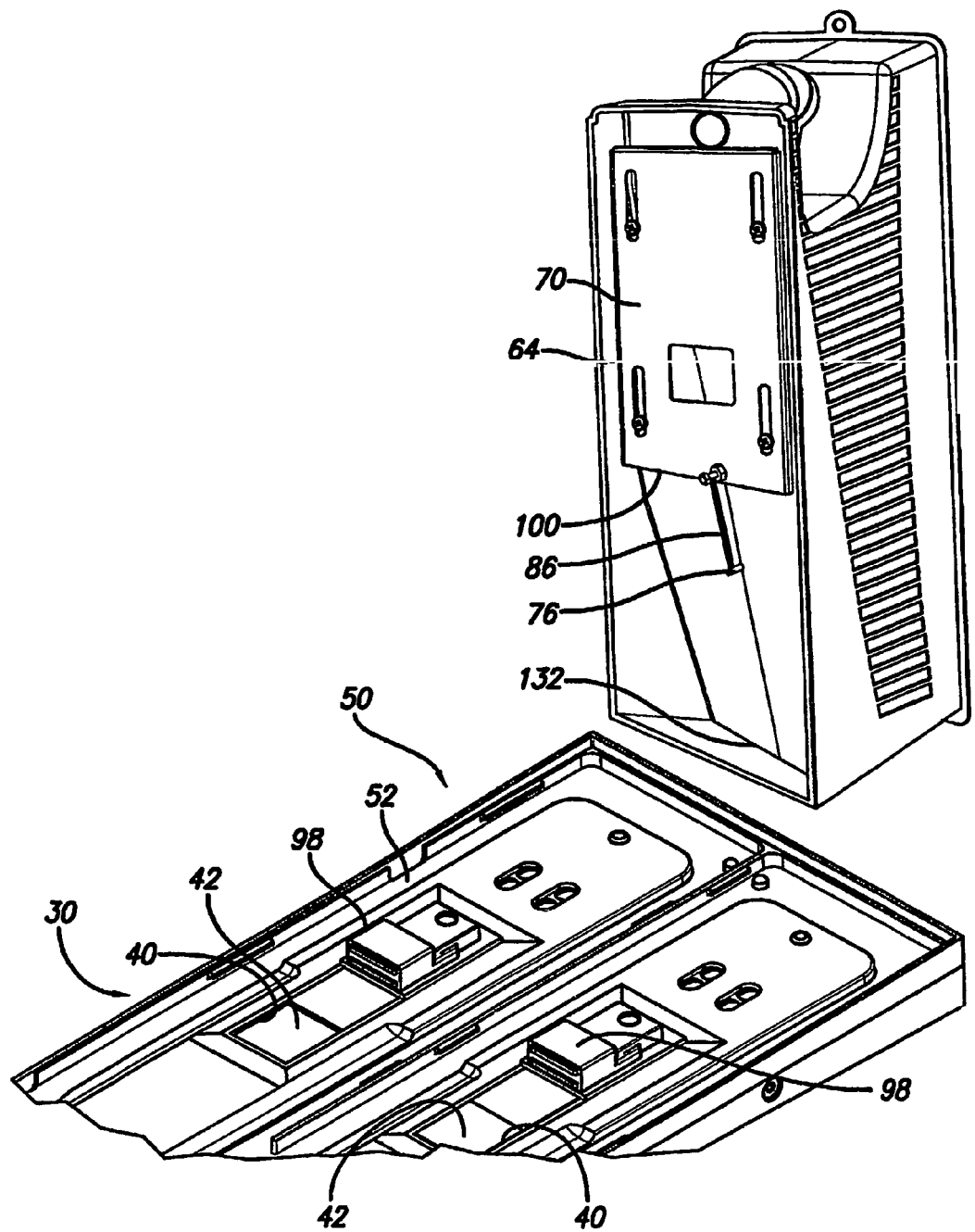
FIG. 10 is a bottom view of a hopper (with side walls removed) and showing an identification and information device retained on the hopper and positioned for coupling communication with the a reader on the top of the grinding assembly and a shutter on the bottom of the hopper in a closed position.
Figure 11:
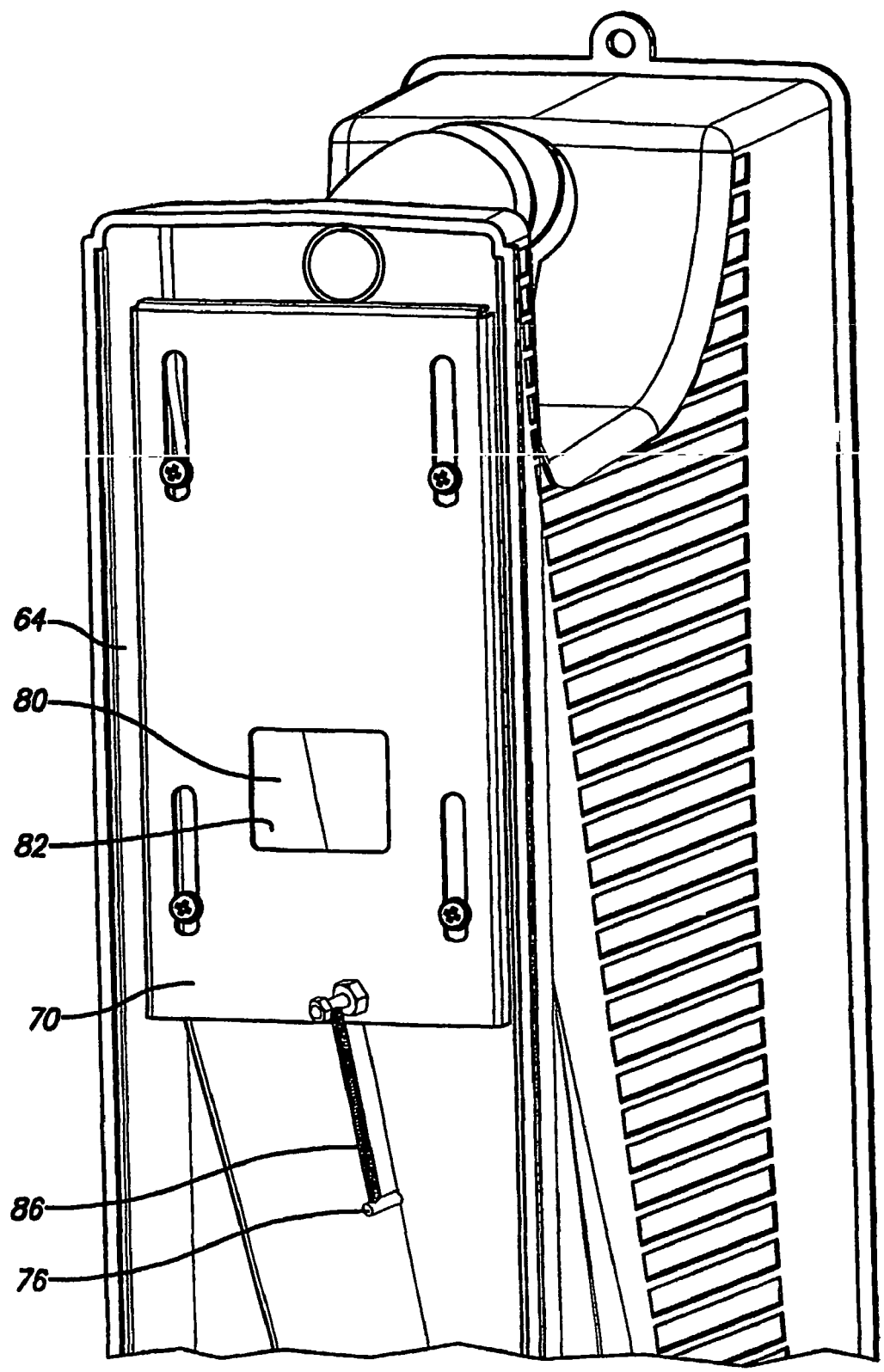
FIG. 11 is a view of the hopper base (side walls removed) with the shutter in an open position.

A lower portion of the hopper 60 includes a shutter 70 as shown in FIGS. 10 and 11. The illustrations of FIGS. 10 and 11 show the lower portion 64 of the hopper 24 without side walls 123 extending therefrom. It is understood that the purpose of this description the lower portion 64 is shown with the understanding that side walls 123 extend from the lower portion upwardly proximate to the handle 32 and a top 72. The side walls 123 form a container or cavity 124 for retaining the beans therein.

Figure 12:
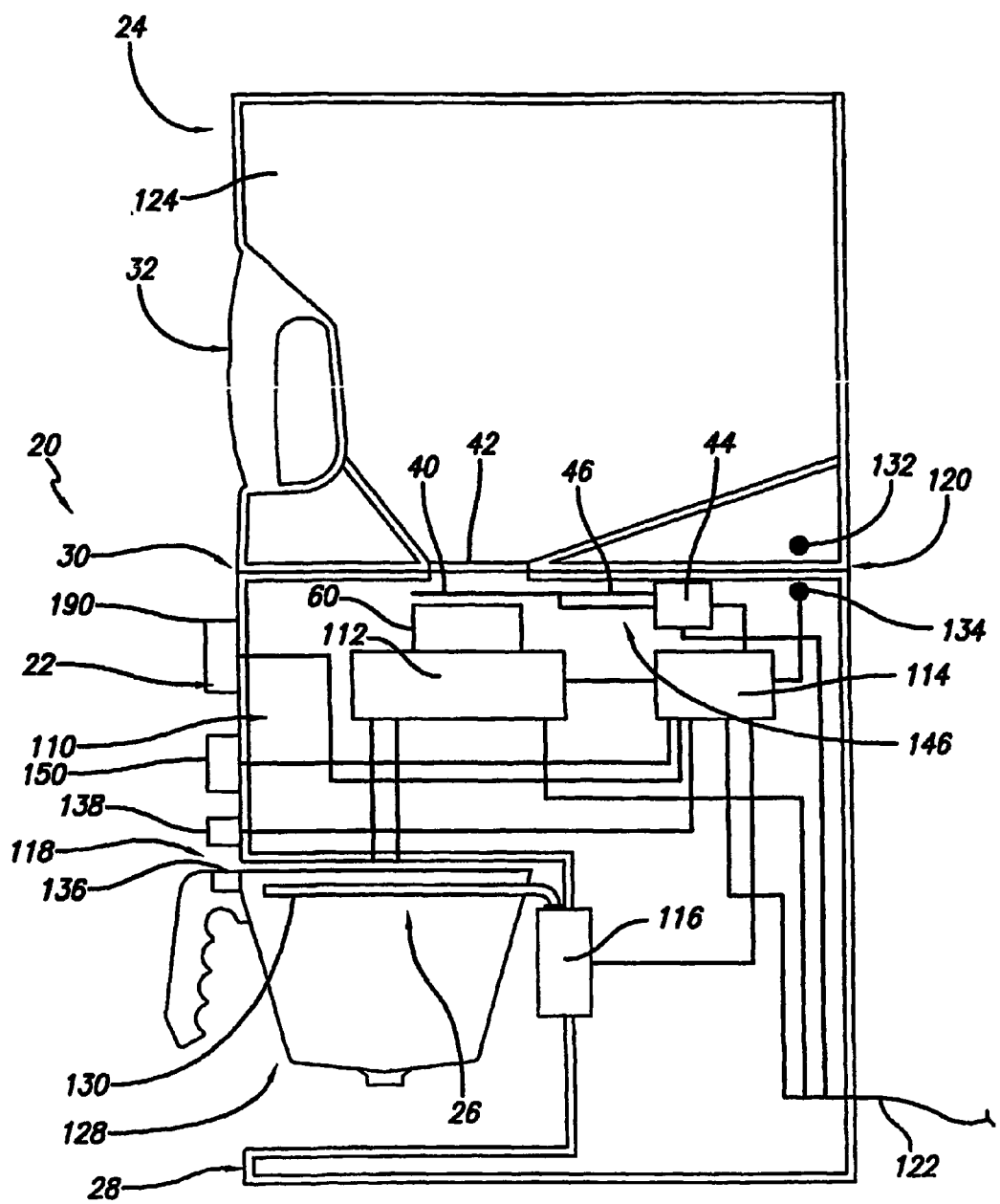
FIG. 12 is a diagrammatic illustration of the grinding machine and system.

FIGS. 10 and 11 provide a view is of an underside 76 of the lower portion 64. The shutter 70 is slidable between a closed position (see FIG. 10) and a normally open position (see FIG. 11) when mounted on the grinder assembly 22. In the normally open position as shown in FIG. 12, an aperture 80 in the shutter 70 is aligned with a passage or hopper outlet 82 formed in the lower portion 64 of the hopper 24. As shown in FIG. 10, the combination of the aperture 80, passage 82 on the lower portion 64 of the hopper 24 can be aligned with the grinder inlet 40 positioned on the open top assembly 30.

The shutter 70 on lower portion 64 of the hopper 24 is only mechanically movable. In other words, there is no electronic or electrical control of the shutter 70. Rather, bean flow from the hopper 24 to the grinder assembly 22 is facilitated by the slide gate 42, carried on the grinder assembly 22 and not on the hopper 24, the slide gate 42 is operated by the controllable solenoid 44 and mechanically connected link 46. This construction of the slide gate 42 on the grinder assembly 22 is well known as indicated above with regard to the '259 patent and has been utilized because of its reliability. Additionally, by placing the selectively controllable elements on the underside surface 58 the system can be made more reliable as this location removes or shields these components 44, 46 from particles, such as pieces of beans, chaff, etc., which might be created by and accumulate as a result of the dispensing of beans. Additionally, using the slide gate 42 to positively close the grinder inlet 40 helps improve safety by preventing placement of objects, either accidental or intentional, into the grinder inlet 40 when a hopper 24 is removed from the open top assembly 30.

With reference to the embodiment shown in FIGS. 10 and 11, the shutter 70 can be returned from the normally open position (normally open during use) by a spring 86. While a spring 86 is shown, other biasing devices may be used to position the shutter 70 in a closed position. Additionally, an embodiment using a magnetic closer is disclosed and is described in greater detail below. The magnetic closer uses a permanent magnet.

The shutter 70 is in a normally open position when in use. This means that the shutter 70 is closed when the hopper 24 is removed from the open top assembly 30. As such, when the hopper 24 is positioned on the open top assembly 30 the shutter 70 is oriented with the aperture 80 aligned with the passage 82 to provide continuous downward flow path of beans from the hopper to the inlet 40 in the manner as taught in the prior art. This eliminates the need to associate electronic components with the hopper to operate the opening and closing of the hopper. This may result in a more reliable system since the control elements 44, 46, 42 are retained on the grinder assembly 22 as taught by the prior art. As such, when a hopper 24 is removed from the open top assembly 30, there can be no change or effect in the control elements. If the control elements were to be directly associated with the hoppers 24, damage to the hoppers would result in damage to the control assemblies.

The shutter 70 can be provided in any one of a number of configurations which do not use a spring 86. For example, numerous prior art grinding devices provide a manually operated slide shutter for a removable hopper. Such grinding devices may also include a device for positioning in or over the passage 82 in the hopper 24. Such additional manually actuated mechanical closing embodiments are well known in the prior art and could readily be substituted for the shutter construction as disclosed.

The cleat area 50 provides one or more flanges 90 which engage a corresponding rib 92 along the bottom edge 54 of the hopper 24. The flanges 90 provide a grip to help facilitate retention of the hopper 24 on the open top assembly 30. Additionally, a ball detent 96 such as a spring-loaded ball detent can also be provided to engage a corresponding area on the hopper 24. This structure helps to retain the hopper 24 on the open. top assembly 30 to resist accidental or unintended displacement for example, as a result of bumping. However, with the controllable slide gate 42 attached to the open top assembly 30, not the hopper 24, there is relatively little need to resist or prevent movement of the hopper as a result of the operation of the slide gate 42 and solenoid 44. In other words, the operation of the slide gate generally does not impose significant forces on the hopper. Instead, the hopper is retained on the open top without the need to reinforce it or lock it in place to oppose the opening and closing forces of the hopper slide gate. Additionally, there is generally no resistance or force associated with the shutter 70 because it is in a normally open position and, as such, there is relatively little need to engage against movement of this structure.

As shown, a stop structure 98 is provided on the cleat area 50 to abut an edge 100 of the shutter 70. The edge 100 abuts the stop 98 when the shutter is positioned with the aperture 80 aligned with the passage 82 as described above. This is a passive mechanical system which does not require any electronic operation. Additionally, it may be desirable to minimize the force that is required to remove a hopper 24 from the grinder assembly 22 in order to minimize the forces on these components and to prevent moving the grinder assembly when removing the hopper 24. In this regard, it is desirable to minimize or prevent canting or otherwise engaging the hopper with the grinder assembly to minimize the force required to disengage the hopper from the grinder assembly.

Turning now to FIG. 12, a diagrammatic illustration of the grinding machine 20 is provided. This diagrammatic illustration provides general information relating to a control system 110 of the machine 20. The control system 110 may include some or all of the following components, but is not limited to these components, a grinder mechanism 112, a controller 114, a weight sensor 116, a reader/sensor 118, a detector assembly 120 and the controllable solenoid or mover 44. Power is provided through line 122 for the grinding mechanism 112, controller 114 and solenoid 44. Power can also be provided to any of the other devices if necessary through the line 122 or otherwise such as through a power supply or through the controller. The grinder mechanism 112 communicates with a cavity 124 defined by the hopper 24. The grinder mechanism 112 also communicates with a discharge chute 126 which dispenses the ground coffee produced by the mechanism 112 into a funnel 128 or other container positioned therebelow.

The controller 114 controllably operates the solenoid 44 to controllably operate the slide gate 42 connected to the solenoid 44 by the link 46. The controller 114 controls the solenoid 44 in conjunction with the operation of the grinder mechanism 112 such that the grinder mechanism 112 generally may be operating when beans are passed from the cavity 124 into the grinder mechanism 112. Additionally, the controller 114 can provide a period of over-grind by operating the solenoid 44 to a closed position prior to terminating operation of the grinder mechanism 112. This over-grind structure, method and system of operation is disclosed in U.S. Pat. No. 5,386,944 assigned to the assignee of the present application and incorporated herein by reference in its entirety.

With further reference to FIG. 12 and U.S. Pat. No. 5,386,944 incorporated herein, the control system 110 can also incorporate weight driven grinding features, system and methods. In this regard, the weight sensor 116 can be used in conjunction with extending arms 130 of the funnel supporting structure 26 to provide weight information to the controller 114. Examples of such sensors 116 are disclosed in Knepler '944 including strain gauges. The weight information provided by the weight sensor 116 to the controller 114 will be used in operating the solenoid 44 and grinder 112.

Also provided on the hopper and machine 20 is the detector and/or information assembly 120. The assembly includes a component or device 132 attached to the hopper and a reader 134 carried on the grinder assembly 22. The device 132 may be in the form of an, RF device, inductive device, conductive device, magnetic device or any other device which can be used in one or more of the method provided herein. The device 132 can be used with one embodiment as a means for identifying the location of the hopper 24 on the grinder assembly 22. In another embodiment, a device 132 can be used which can store information. In this regard, information can be stored on the hopper 24 to identify the type of bean in the hopper or other parameters associated with the beans retained in the cavity 124. The reader 134 is a reader which is compatible with the device 132 to provide information to the controller 114.

An additional feature of the control system 110 is the use of a similar device 136 and reader 138 with the funnel. Device 136 can be identical to or similar to that as described above with regard to the device 132. Reader 138 should be similarly compatible with the device 136. Combination of the device and reader 136, 138 (118) can be used to detect the presence or absence of the funnel 128, convey recipe information from the funnel 128 to the grinder assembly 22 or provide information to or receive information from detector assembly 120. In this regard, information can be transferred from the hopper 24 to the funnel 128 and optionally or in addition to information can be transferred from the funnel 128 to the hopper 24. In any of these embodiments, information can be provided from the hopper 24 and the funnel 128 to the controller 114 to control operation of the grinding machine 20.

Additionally, these assemblies 118, 120 can be used to lock out the grinder mechanism 112 in the event all conditions necessary for grinding are not met. For example, if the funnel 128 or hopper 24 is not properly positioned or is missing the grinder 112 can be locked out. Similarly, the solenoid 44 can be locked out in the absence of either one or both of these structure 24, 128 to prevent grinding or opening of the grinder inlet 40 without suitable barriers, such as the hopper 24 being in place. These assemblies 118, 120 are disclosed in U.S. patent application Ser. No. 10/271,619 and U.S. Pat. Nos. 6,465,035, 6,479,086 and 6,238,721 assigned to the assignee of the present application and incorporated herein by reference it their entirety.

Figure 3:
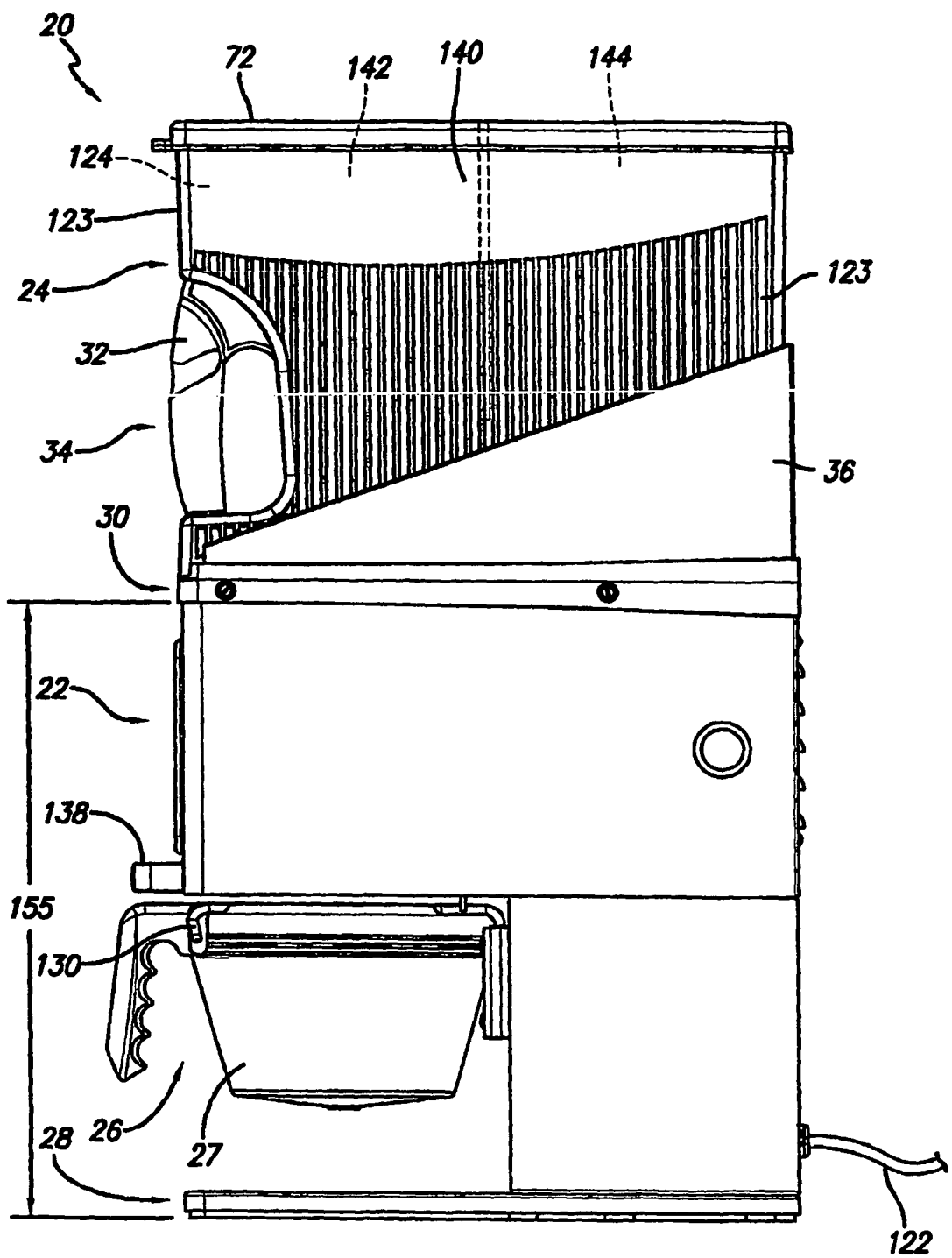
FIG. 3 is a side elevational view of the coffee grinding machine as shown in FIGS. 1 and 2 showing a separator positioned in a cavity defined by the hopper and a funnel retained below the grinder assembly.
Figure 4:
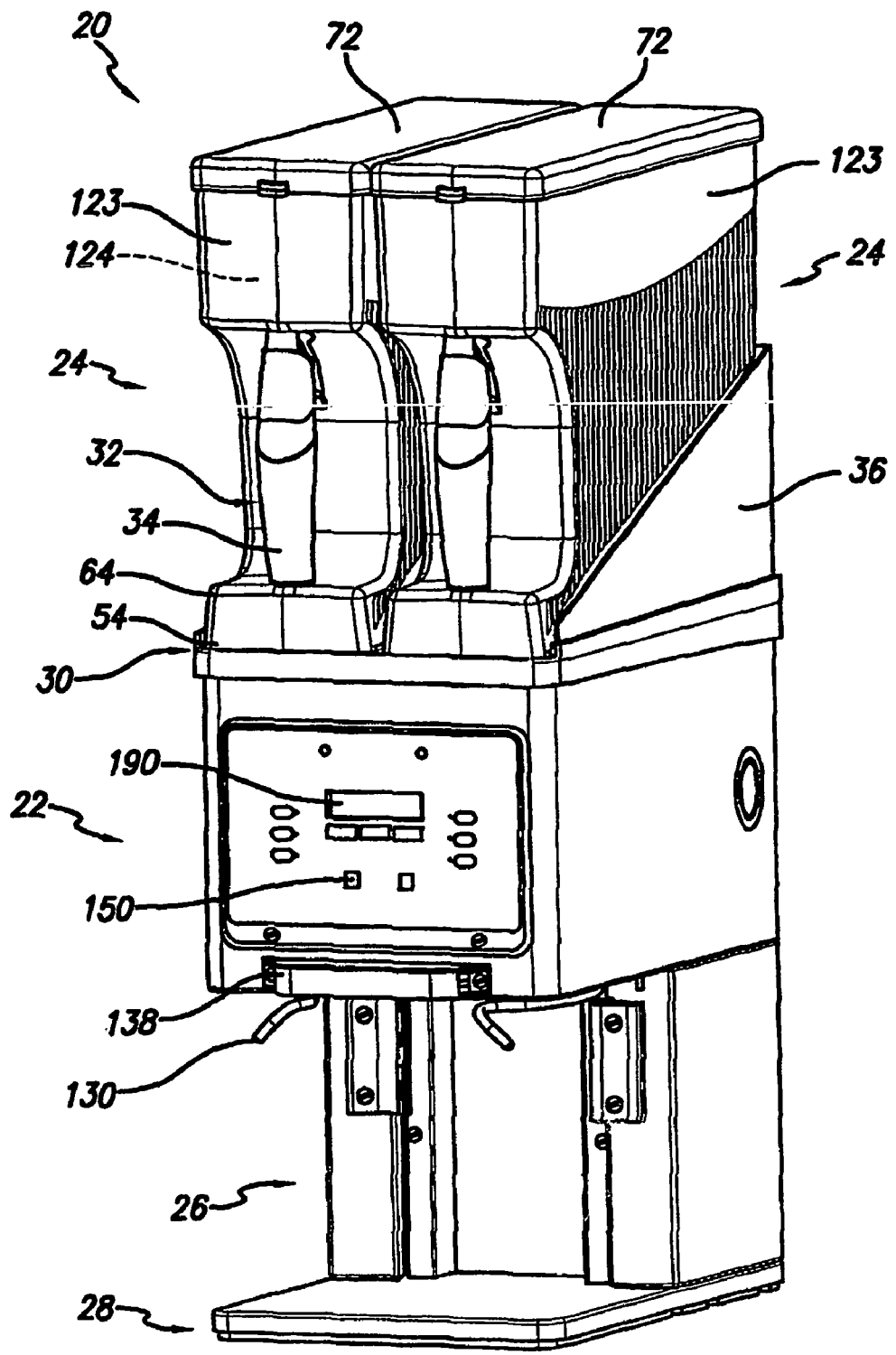
FIG. 4 is a front elevational view of the coffee grinding machine as shown in FIGS. 1-3.
Figure 5:
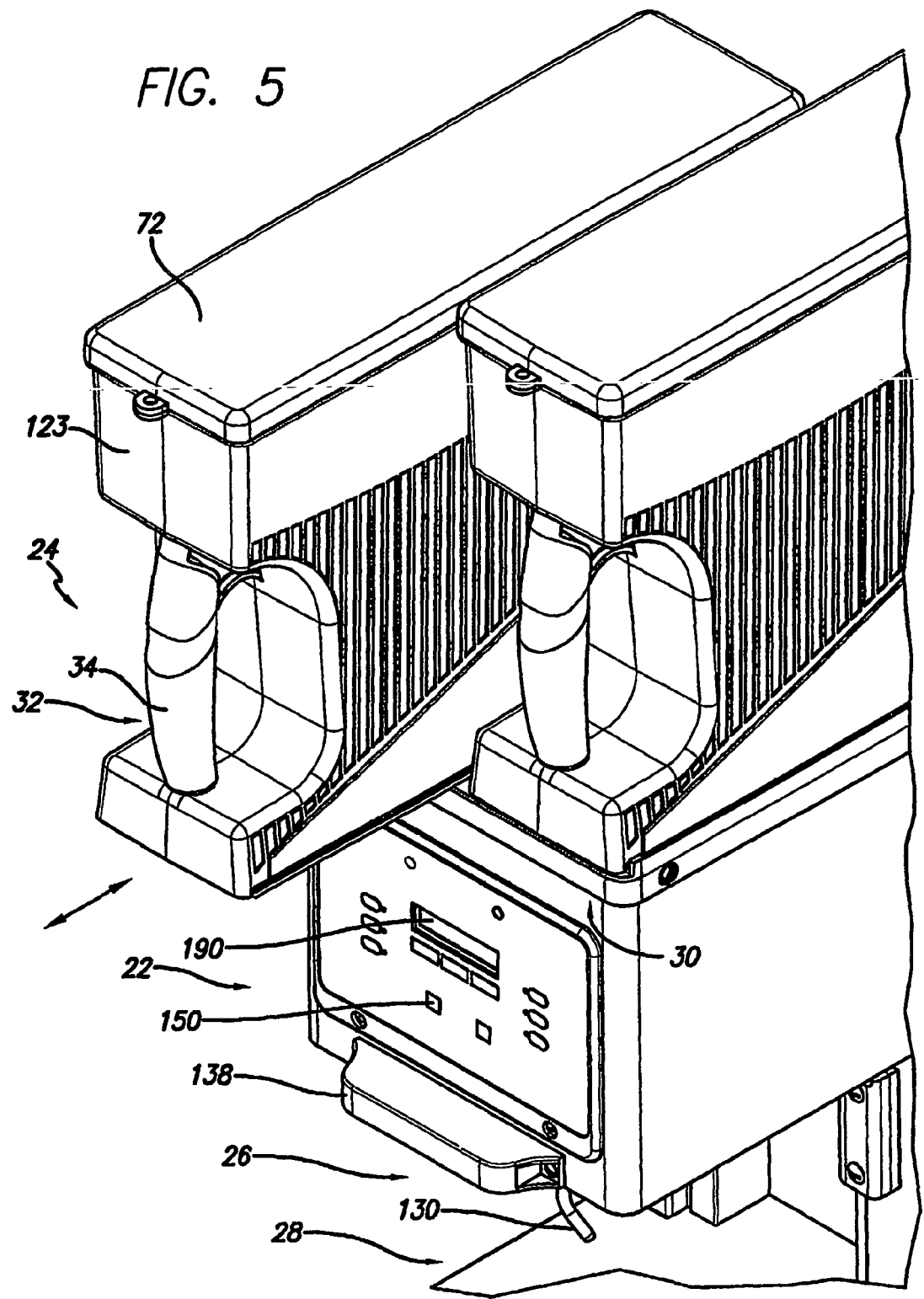
FIG. 5 is an enlarged, partial fragmentary, perspective view of an embodiment of the coffee grinding machine as shown in FIGS. 1-4 in which one hopper is shown on an open top assembly of the grinder assembly and a second hopper is shown being generally horizontally displaced from the open top assembly.

With reference to FIG. 3, a side elevational view of the grinding machine 20 is shown. As shown, the hopper 24 includes a separator 140 which divides the cavity 124 into at least a first area 142 and a second area 144. The separator 140 allows the operator of the grinding machine 20 to alter the capacity of the hopper 24. As such, the separator 140 can also be positionable in one or a variety of positions within the hopper. This allows the first area 142 to be increased in size, up to the maximum capacity of the cavity 124 or decreased in size to accommodate a smaller quantity of coffee beans. This may also be useful in limiting the quantity of beans that are retained in the hopper 24 at any given period of time. This will facilitate frequent replenishment of beans to keep the quantity retained in the first area 142 fresher. It should be noted that the first area 142 communicates with the passage 82.

The grinding machine 20 includes one or more hoppers 24 placed on the open face surface in the cleat area 50 of the open top assembly 30. A quantity of coffee beans or other substance is retained in the cavity 124 of the hoppers 24 for dispensing into a grinder mechanism 112 positioned in the grinding assembly 22. Means 146 for controllably dispensing beans from the hopper 24 to the grinder mechanism 112 include a controllable solenoid 44 coupled to a controller 114, a slide gate 42 and link 46 connecting the slide gate 42 to the solenoid 44.

A user grips the handle 32 with generally with their hand to grip and support the hopper 24 for placement on the open top assembly 30. When the hopper 24 is properly positioned the detector assembly 120 confirms placement of the hopper. When the hopper is placed on the cleat area 50 one or more ribs 92 on the lower area 64 of the hopper 24 are engaged under one or more corresponding flanges 90. When placed, the shutter 70 or other mechanism allows beans to flow from the hopper 24 to the slide gate 42. Operation of the dispensing means 146, separate from the shutter 70 controls the passage of beans from the hopper 24 to the grinder mechanism 112.

A funnel 128 is placed for receiving ground material through the chute 126. The reader assembly 118 detects the presence of the funnel 128 and communicates any information from the funnel 128 to the controller 114 or from the controller 114 to the funnel 128.

If all of the conditions for grinding are satisfied as detected by the controller 114, grinding may proceed. Grinding may occur automatically depending on the operation of the controller and the related assemblies 118, 120 or may be initiated by an activation switch 150 connected to the controller 114. It should be noted that while hardwire connections are shown in FIG. 12 between the controller 114 and various components, these connections may also be wireless connections or any other connection which facilitates the transmission of information to, and where necessary from, the controller 114 to the respective components.

As noted above, the grinding operation carried out by the grinder mechanism 112 can be time based whereby the dispense means 146 are opened for a predetermined period of time, weight drive grinding employing the sensor 116 and methodology of the patents set forth above, as well as a combination of time and weight driven grinding. An over-grind period may be provided to clean out the grinder 112 and chute 126.

The hopper 24 can be removed from its placement on top of the open face surface 52 of the open top assembly 30 for changing the hopper 24 with a different hopper or for refilling the hopper when it runs low or is empty. To remove the hopper 24 the handle 32 is gripped and the hopper is generally forwardly slid or displaced from the cleat area 50. The front facing generally horizontal or substantially non-vertical loading of the hoppers on the open face surface 52 is at a convenient level for users to place the hoppers on top of the grinder assembly 22. In this regard, the disclosed configuration does not require lifting or other more strenuous handling of the hoppers 24. The base 28 is generally placed on a countertop with the grinder assembly 22 rising a modest dimension 155 above the base 28. The dimension 155 positions the handle 32 of the hoppers 24 at a convenient location which generally does not require straining or reaching to grip and carry the hopper 24. Additionally, the size and dimension of the grip which generally accommodates a user's entire hand improve the mechanics of gripping and carrying any weight associated with the hopper 24.

As noted above, the hopper can include an adjustable separator 140. The separator 140 also helps to facilitate reducing weight in the hopper by reducing the area which can contain beans. Of course, the second area 144 being empty does not add any weight to the hopper. As a result, the mechanics of handling the hoppers 24 are further enhanced by the separator 140.

Figure 13:
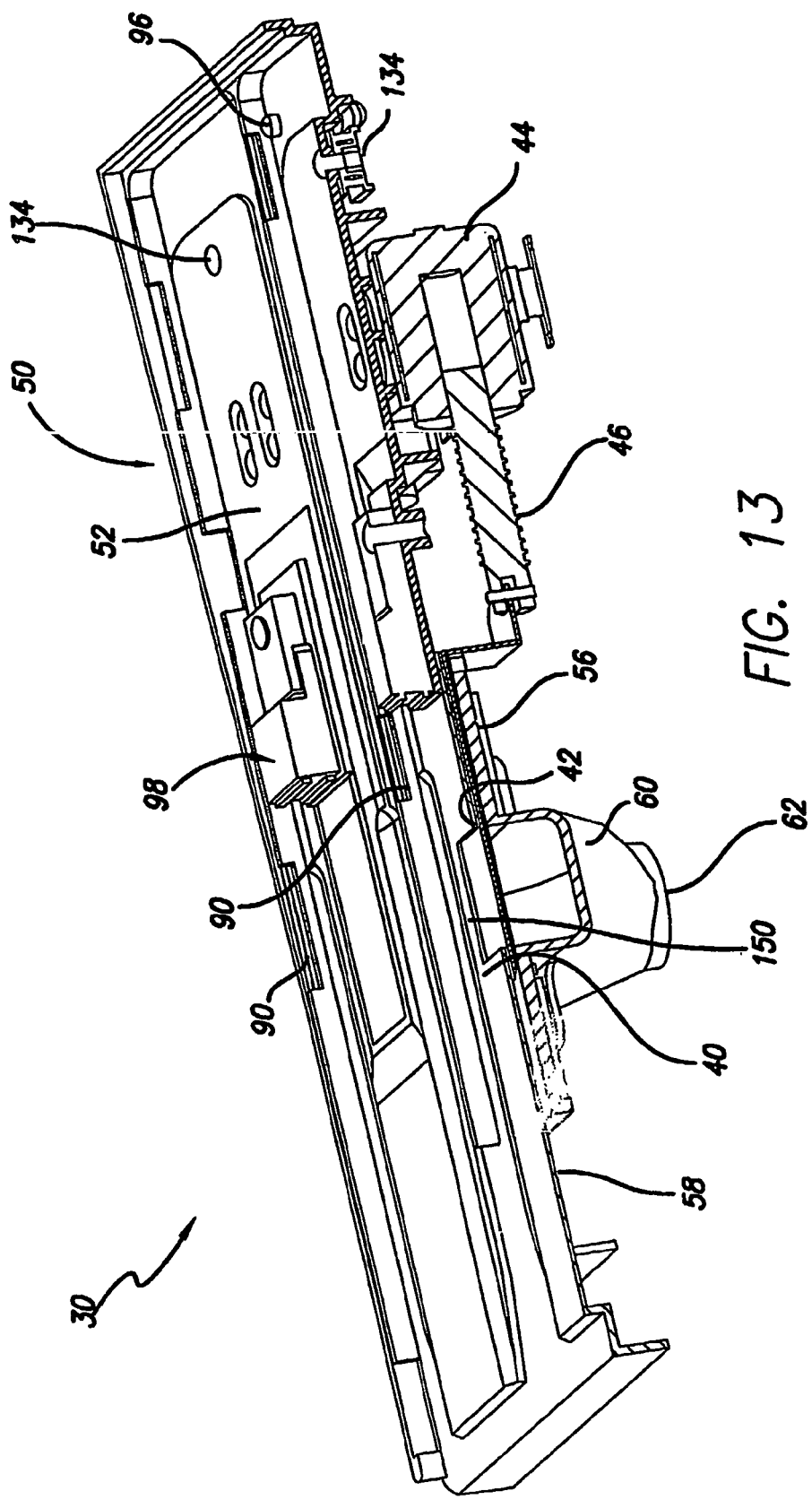
FIG. 13 is a cross-sectional, side elevational view taken line 13-13 in FIG. 7 of the open top assembly.

As shown in FIG. 13, the side elevational view shows the hopper slide gate 42 in the closed position covering the grinder inlet 40. A leading edge 150 of the slide gate 40 is beveled so as to provide a dividing, cutting or otherwise separating action to separate the flow of beans that otherwise would flow through the grinder inlet 40. During the closing phase of the movement of the slide gate 42, the beveled 150 helps to facilitate closing of the inlet 40 and reduces or prevents beans from being trapped between the leading edge and a corresponding portion of the inlet 40.

Figure 14:
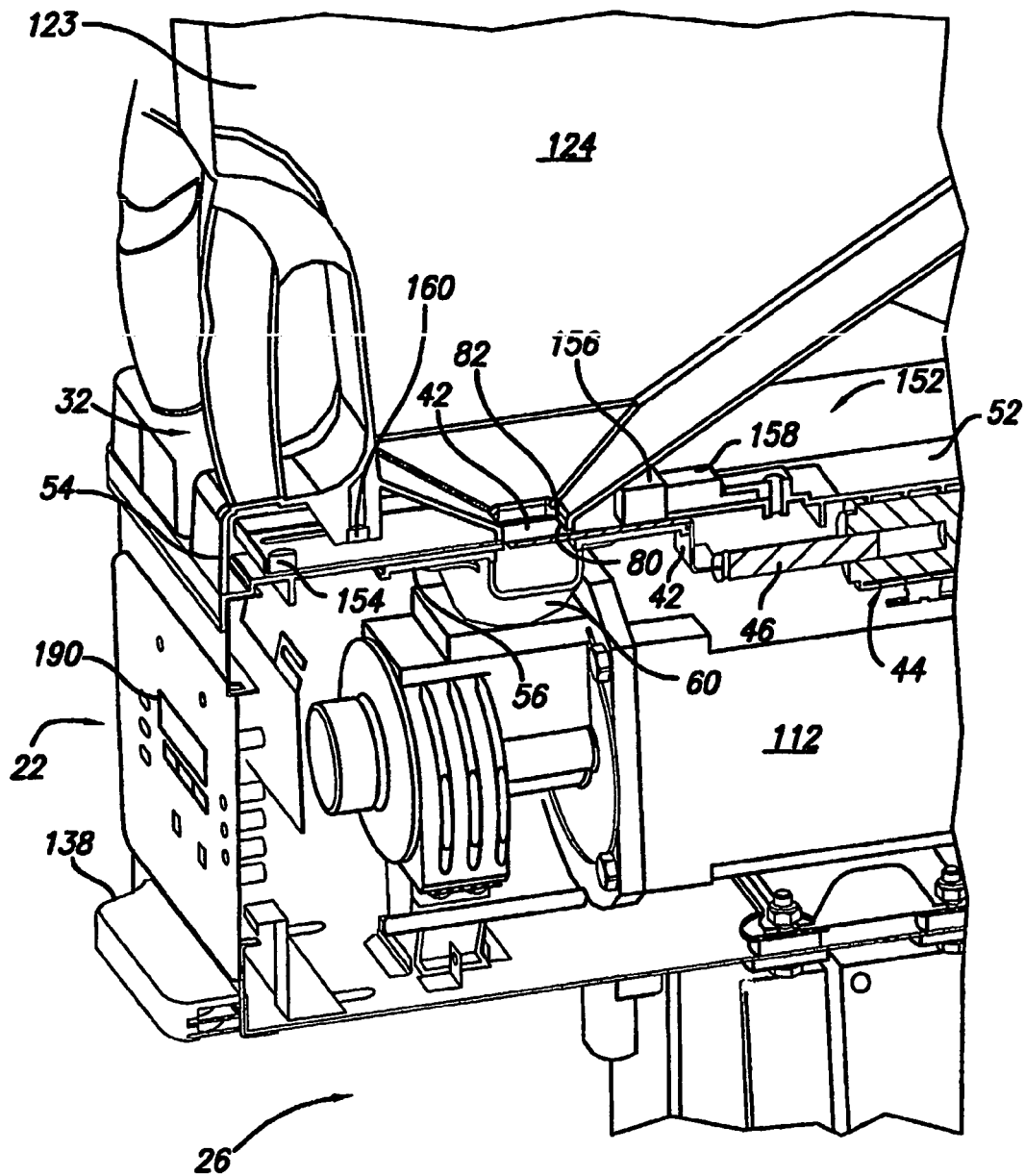
FIG. 14 is an enlarged, cross-sectional, partial fragmentary view of the open top assembly with a hopper positioned thereon showing the shutter in a normally open position.
Figure 15:
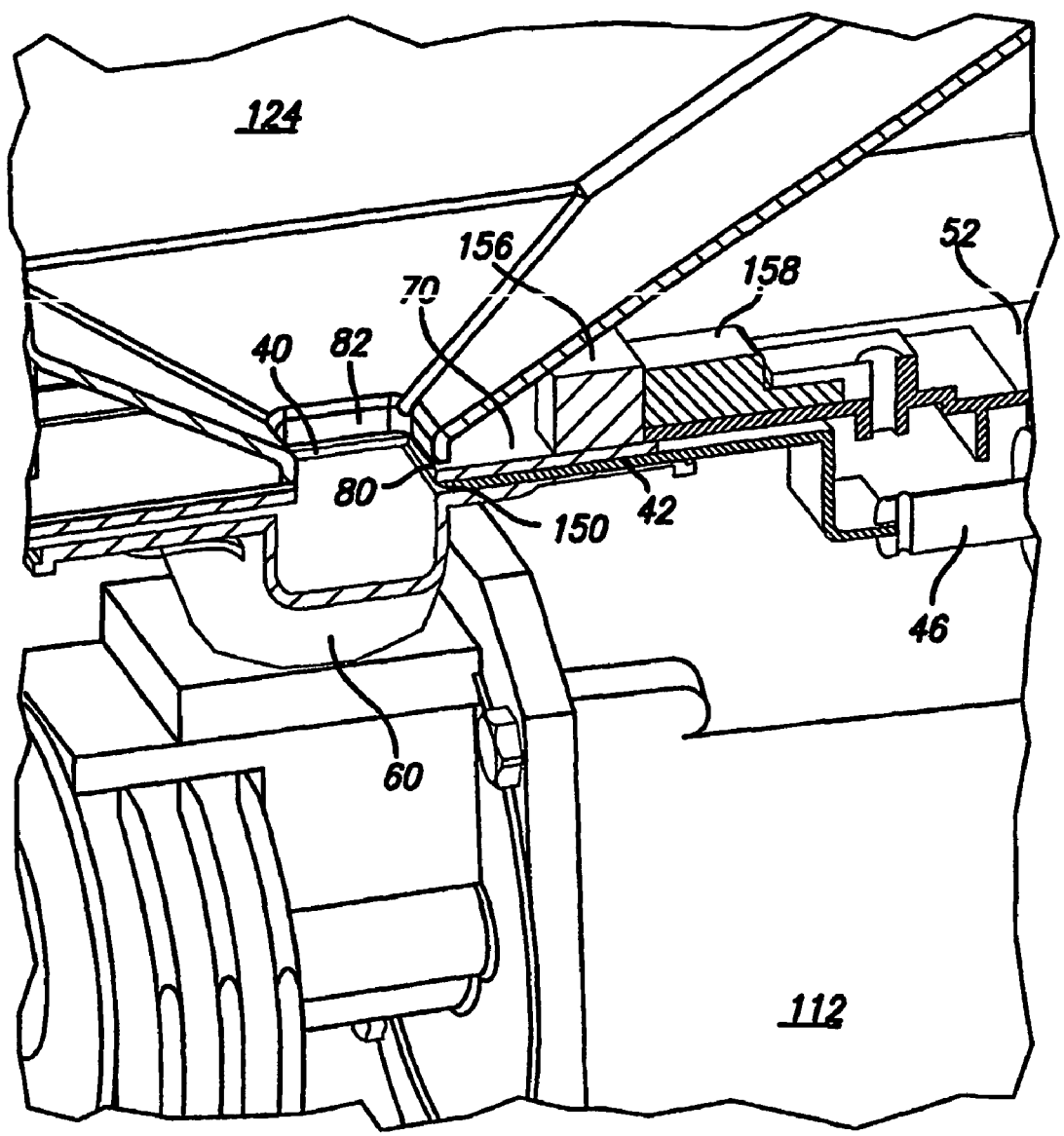
FIG. 15 is a view similar to that as shown in FIG. 14 in which the slide gate has been actuated by the connector and mover or driver to allow the passage and aperture to communicate for dispensing beans from the hopper to the grinder assembly.
Figure 16:
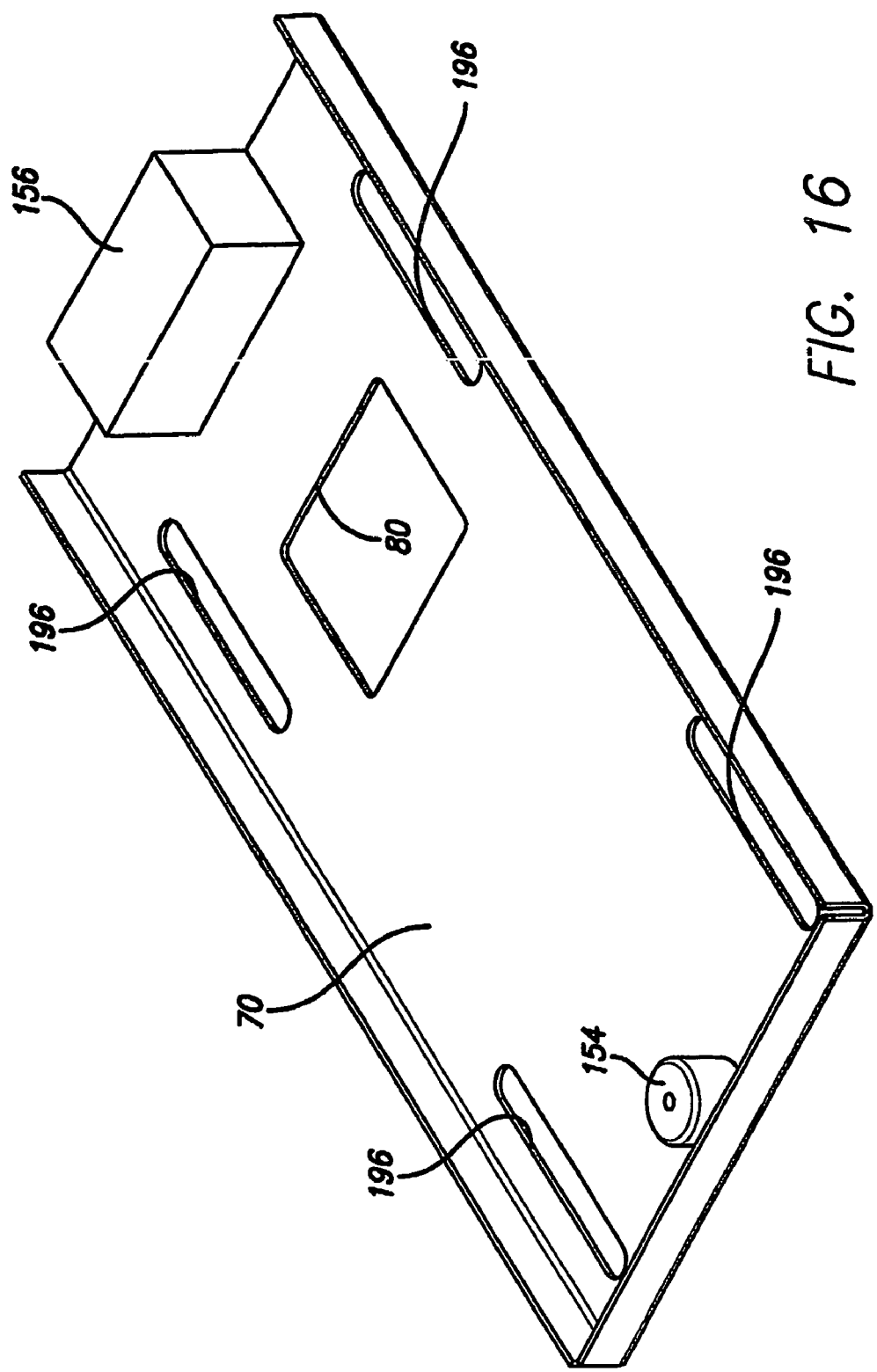
FIG. 16 is a perspective view of a shutter as used with the embodiment which employs magnets.
Figure 17:
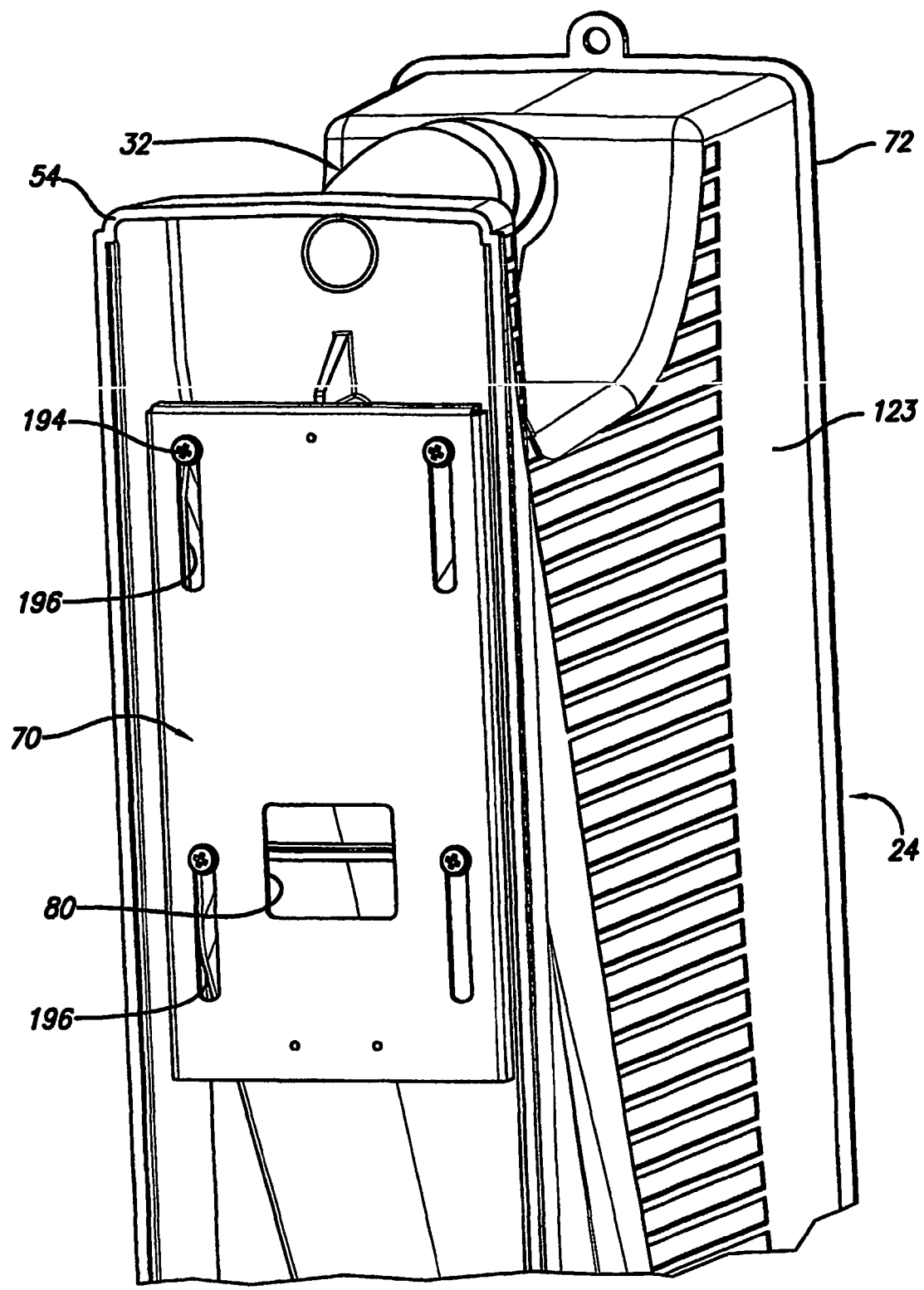
FIG. 17 is a bottom, partial fragmentary, perspective view of a hopper with the shutter attached thereto.
Figure 18:
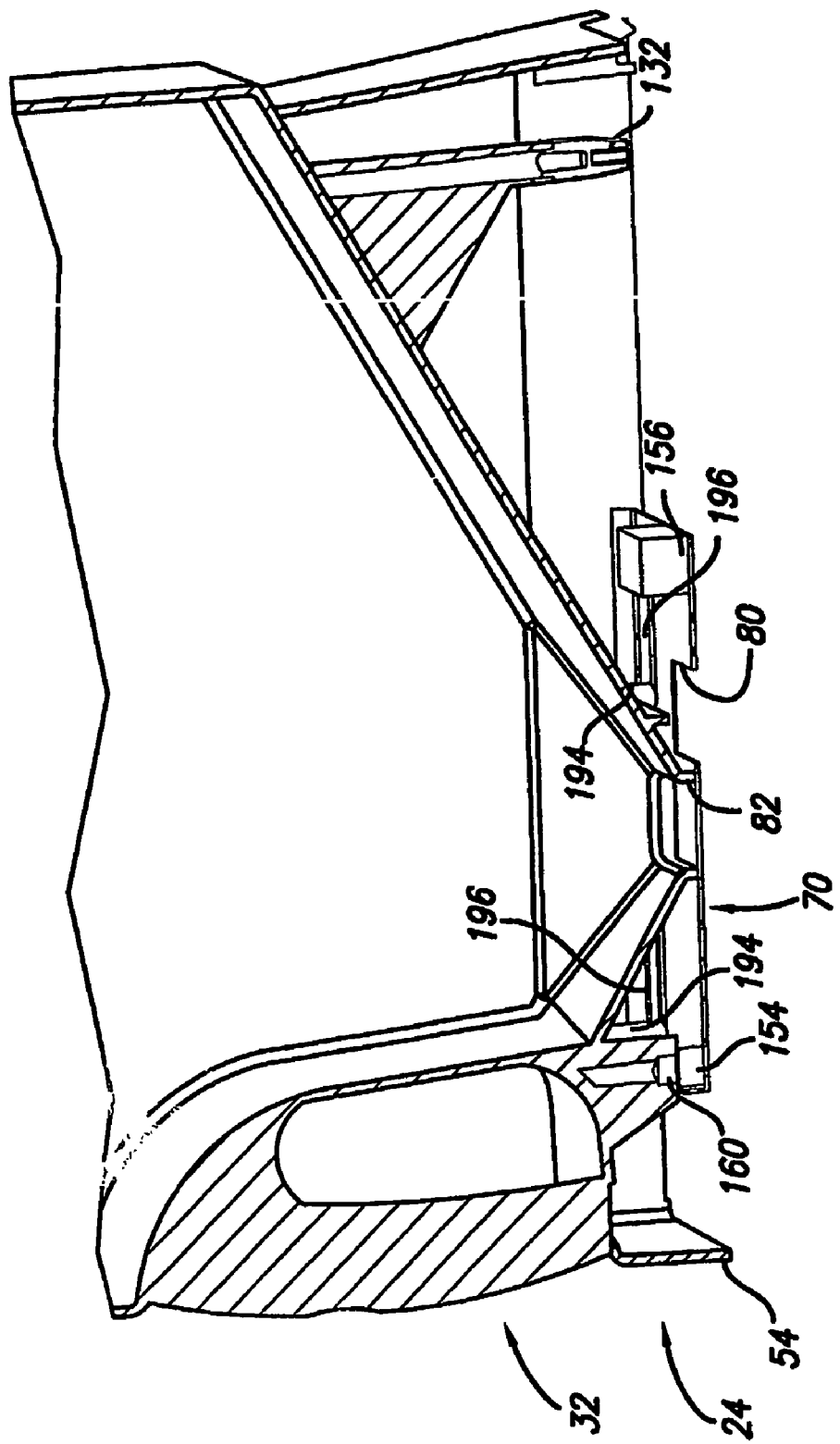
FIG. 18 is an enlarged, partial fragmentary, cross-sectional view of a lower portion of a hopper with the shutter in the closed position.

As shown in FIG. 13, the mover or driver 44 is in the closed position thereby retaining the slide gate 42 in a position over the inlet 40. This is consistent with the operation of prior art devices as disclosed above. In reference to FIGS. 14 and 15, the progression from a closed position to an open position of the slide gate 42 relative to the inlet is shown. With reference to FIGS. 14 and.15, the hopper 24 is shown in cross-section attached to the open top assembly 30. As shown, this configuration results in the shutter 70 being positioned in the position in which the aperture 80 communicates with the upper outlet 40. As such, beans can flow from the hopper through the aperture 80 and are subject to opening and closing of the slide gate 42. (See FIG. 15.) With further reference to FIGS. 16-18, the configuration of the shutter 70 in association with the hopper 24 is shown. With reference to FIG. 15, the hopper 24, the associated shutter 70 and open top assembly 30 provide a magnetic opening and closing assembly 152. As shown, the magnetic opening and closing assembly includes a pair of blocks 154, 156 which are positioned for selective engagement with corresponding magnets 158, 160.

The combination of the magnet 160 and block 154 retain the shutter 70 in a closed position (see FIG. 18) when the magnet 160 and block 154 are aligned. The magnetic forces of the magnet attract the block 154 to retain the shutter 70 in the closed position covering over the passage 82 with the aperture 80 shifted out of alignment with the outlet 40.

Initially, when the hopper 24 is placed on the open top assembly 30, the lower portion 64 of the hopper 24 is slid generally horizontally or substantially non-vertically along the surface 52 and eventually engaging the flanges 90 in the cleat area 50. During the travel of the hopper 24 from the front of the grinder toward the rear of the grinder, the block 156 while eventually abut the magnet 158. Abutment of the block 156 against the magnet 158 results in magnetic attraction and retention of the block 156 against the magnet 158. While the magnetic attraction is not essential at this point, it will be used later when removing the hopper 24 from the open top assembly 30. Upon further displacement of the hopper relative to the surface 52, the abutment of the block 156 against the magnet 158 will result in shifting of the shutter 70 retained underneath the hopper 24 and eventual alignment of the aperture 80 with the passage 82. This is the normally open configuration of the hopper on the grinder assembly 22.

When removing the hopper 24 from the grinder, the user grips the handle 32 and generally horizontally withdraws the hopper 24 from the open top assembly 30. Placement and removal of the hopper relative to the open top area is substantially non-vertical. Upon applying withdrawing forces generally horizontally, the hopper body is moved forwardly off of the machine. The forward movement of the hopper 24 results in shifting of the shutter 70, thereby disengaging the alignment of the aperture 80 with the passage 82. Continued shifting of the shutter with the block 156 engaged with the magnet results in aligning the block 154 with the magnet 160. Once the magnet and block 160, 154 are sufficiently aligned, magnetic attractive forces result in engaging the two bodies 160, 154. The magnet and block 160, 154 are aligned when the passage 82 is covered by a portion of the shutter 70. At approximately this position, the continued pulling on the handle increases the forces urging separation of the block 156 from the magnet 158. At a point in which the withdrawing forces on the hopper 24 are greater than the attractive forces between the magnet and block 158, 160, the withdrawing forces overcome the magnetic forces and the block 56 is disconnected or separated from the magnetic effects of the magnet 158. In this position, the shutter 70 is retained closing the passage 82 by the magnet and block 160, 154. It will be appreciated that the position of the magnets and blocks can be mixed or reversed with the same effect as described hereinabove. In this regard, either both blocks can be carried on the shutter 70 or both magnets can be carried on the shutter 70. Alternatively, one magnet and one block can be positioned on the shutter for alignment and operation as described above with the other corresponding block and magnet.

Figure 19:
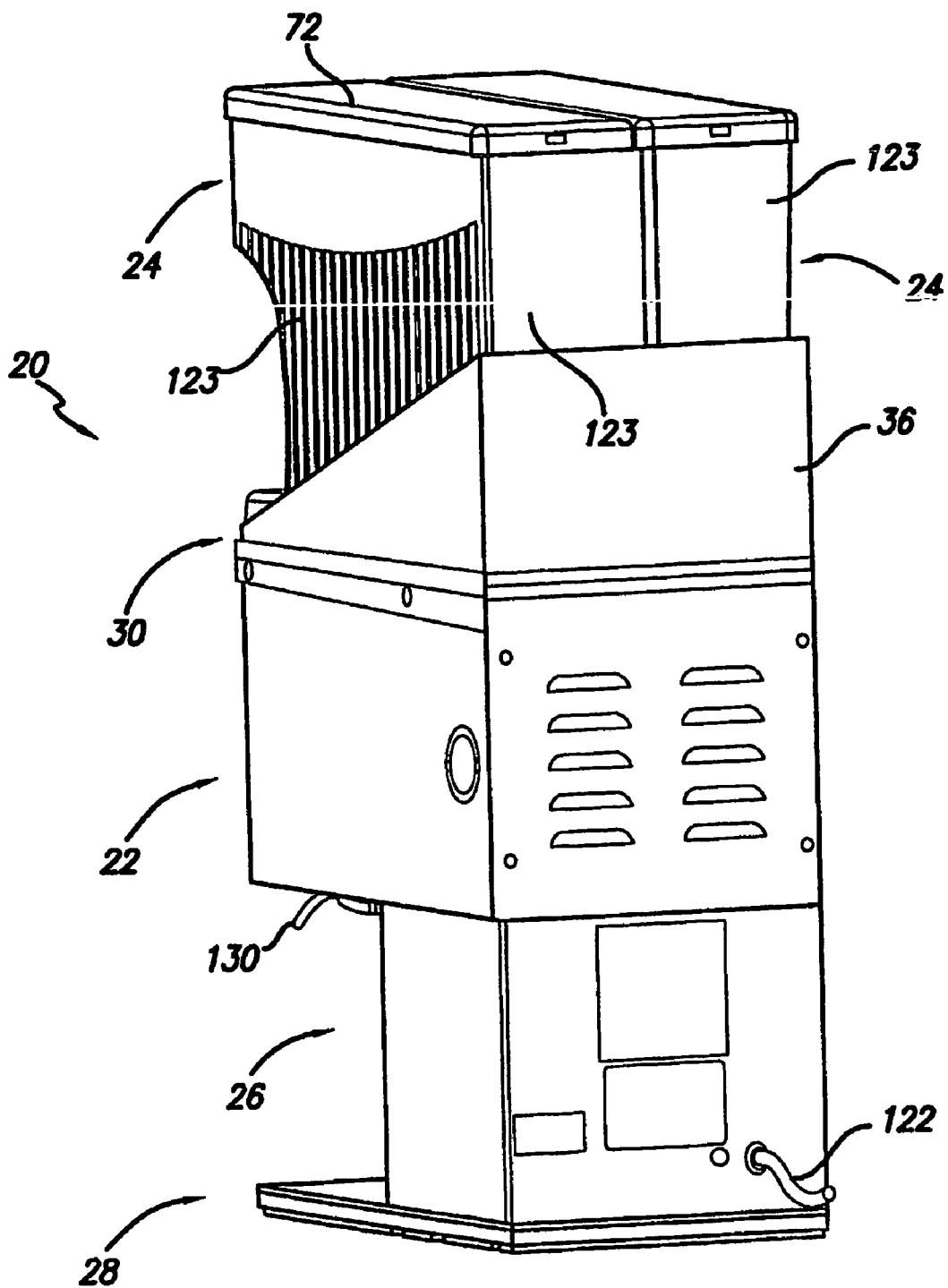
FIG. 19 is a rear elevational view of the grinding machine.

With reference to FIG. 19, a rear view of the grinding machine 20 is shown. This view is provided to show that even if a cosmetic shield 36 is used in conjunction with the hopper 24, the cosmetic shield can be positioned low enough so that the transparent sidewalls 123 can be viewed from the backside of the machine. This may provide value to the user of the machine such that the beverage consumer can view the product retained within the hopper through the generally transparent sidewalls 123. This may facilitate enhanced beverage experience and merchandising such that the consumer can see that fresh beans are being ground. Because the shield 36 is cosmetic, it is envisioned that the vertical dimension of the shield can be reduced or completely removed as it provides no structural support for retaining the hopper 24 on the open top assembly 30.

Figure 20:
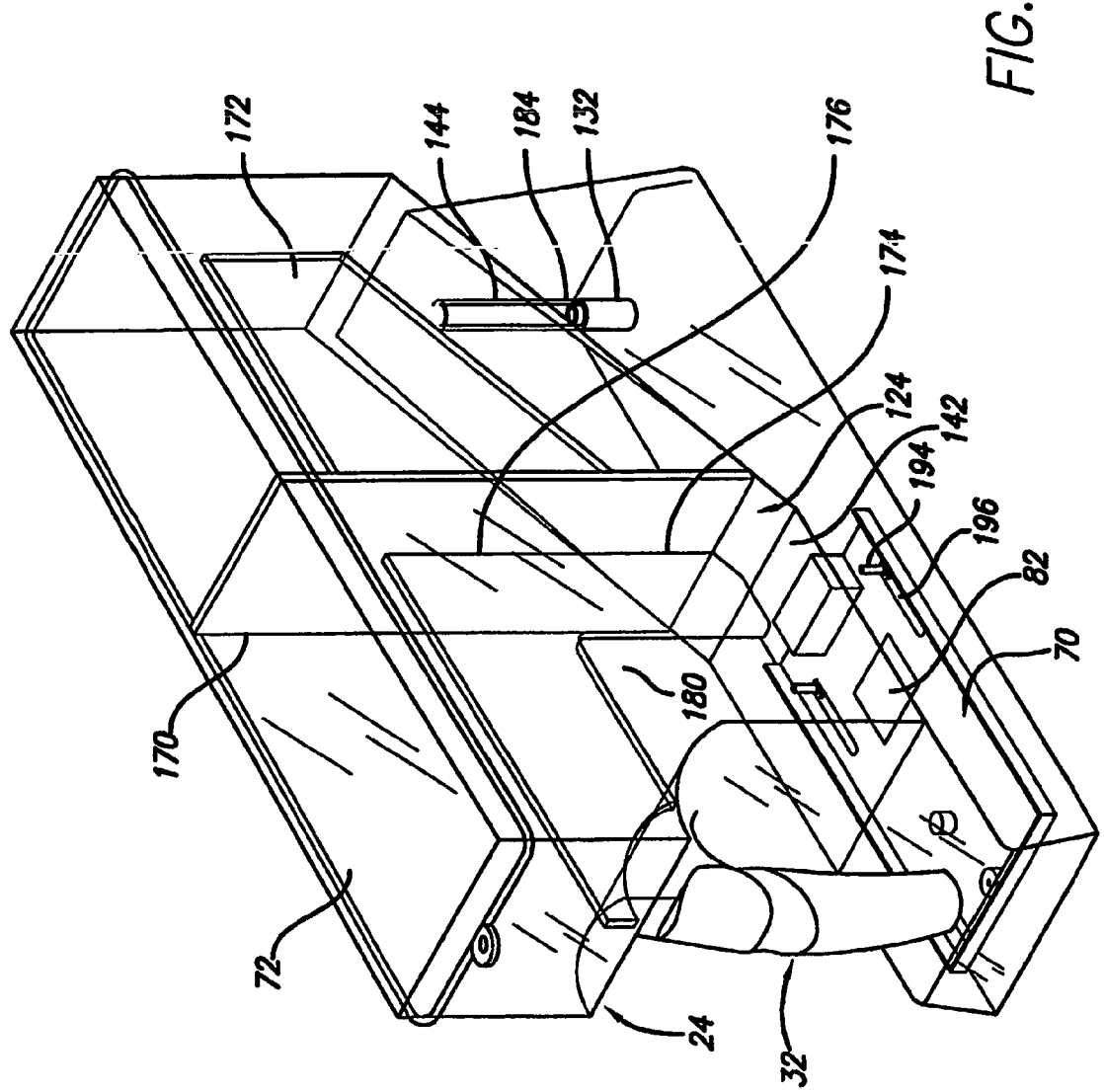
FIG. 20 is a perspective view of a hopper including a divider assembly retained therein.

FIG. 20 provides a view of a divider system which employs a first panel 170 and a second panel 172. The first panel 170 includes a first notch 174 and the second panel includes a second notch 176. When the first panel 170 is engaged with the second panel 172, the notches, or slits, 174, 176 are aligned such that a portion of the first panel is retained in the second notch and a portion of the second panel 172 is retained in the first notch or slit 174. The interlining of the notches 174, 176 and corresponding panels 170, 172 provide structural engagement and support to retain the panels 170, 172 in relative position. The panels 170, 172 are sized and dimensioned to be retained in the hopper cavity 124. The cavity is divided by the first panel 170 into a forward portion 142 and rear portion 144. The division of the cavity 124 into two portions 142, 144 allows a reduced quantity of beans to be retained in the hopper, if necessary. The second panel 172 provides structural alignment and support from front to back to support the first panel 170. This eliminates the need to have structure internal to the hopper for supporting this divider system. As can be seen, the hopper cavity 124 retains the panels 170, 172 therein. A passage or opening 180 is provided in a portion of the forward section of the second panel 172. The opening 180 allows beans in the forward portion 142 of the cavity 124 to flow around the panel 172 and into the passage 82 in the bottom of the hopper 24.

As can also be seen in FIG. 20, the hopper carries the component 132 as described above. The device or component 132 can be in the form of an RF or other device as described above. Positioning the device 132 on the structure 184 helps to position the component in a relationship proximate to the corresponding reader or detector 134 as also described above.

In use, the grinding machine 20 as disclosed includes the grinding assembly 22 and the hopper 24, either one or a plurality, retained on the open top surface 30. The hoppers are manually selectively placed on and removed from the grinder assembly 22 by generally horizontally sliding the hopper 24 relative to the open top assembly. The relative operation and position of the hoppers 24 on the grinder assembly 22 facilitates easy attachment and removal of the hoppers without added strain. Additionally, leaving the open top assembly 30 open and easily accessible, the machine 20 can be more easily cleaned of grinding particles and debris which might otherwise accumulate. The hoppers 24 include a shutter 70 to block and permit passage of beans from the hopper. The hopper 24 and shutter 70 are configured so that the shutter 70 is in a closed position covering a passage 82 of the hopper 24 when the hopper is removed from the grinder assembly 22 and the shutter is in a normally open position allowing beans to pass therethrough when it is positioned on the grinding assembly.

Operation of the grinder is facilitated by a slide gate mechanism of generally known construction and operation which opens and closes of the normally open passage 82 and aperture 80 in the shutter 70. A device 132 is carried on the hopper 24 to provide information and position sensing in combination with the reader 134 provided on the grinder assembly 22. If the user has properly aligned the hopper 24 with the opening top assembly 30, the device 132 will be detected by the reader 134 indicating that the grinder can operate.

The component is also important in that it may carry information about the grind time and, perhaps, grind setting in an adjustable grinder. The reader and component provide information to the controller 114. As indicated above, if the grinder assembly is adjustable, the component 132 can provide information about the grind setting of the grind mechanism 112 to properly space grinding structures or burrs retained in the grinding mechanism 112. An adjustable grinder is disclosed in corresponding PCT Application No. PCT/US04/11741, filed Apr. 16, 2004 that claims priority from U.S. Provisional Patent Application No. 60/463,307, filed Apr. 16, 2003, the entirety of both this provisional and PCT application are incorporated herein by reference.

Additionally, the component 132 can be programmed to provide information about the beans retained in the hopper to provide information for example, such as recipe information, for the particular type of bean retained in the hopper. For example, if a French roast bean is retained in the hopper, the chip can be encoded with information about this particular type of bean. The information may be in the form of the name of the bean and, perhaps, additionally the grind time associated with the various batch sizes or volumes for brewing. The information may be displayed on a display 190 provided on the machine which information is provided from the controller 114 coupled to the reader 134 and component 132. The placement of information on the component 132 allows the information associated with the component and the corresponding bean retained in the hopper to travel with the hopper and, as such, does not require reprogramming at different grinders. In other words, a smart chip is provided to provide information to the grinder on which the hopper 24 is attached.

Once the hopper has been properly slid into engagement and the hopper location is confirmed and, possibly, recipe or other information is confirmed, the grinding process may start. The method of grinding starts by initiating a grinding cycle which can be initiated either automatically by placement of a funnel 128 or other structure underneath the grinder whereby activation by a start switch. Once the grinding cycle is initiated, the slide gate 42 is shifted to open the opening to allow beans to flow from the hopper passage 82 through the aperture 80 and into the grinder 112. At the conclusion of the grinding cycle, the slide gate is returned to the closed position by operation of the driver which is linked or directly connected to the slide gate. Once the slide gate is closed, the grinder may continue to operate for a predetermined period of time to allow all of the beans that have been dispensed into the grinder to be ground and expelled from the grinder.

By way of review, when the hopper is attached to the open top assembly, the block 156 will initially abut the corresponding magnet 158. Upon continued sliding of the hopper from front to rear on the open top assembly, the shutter 72 will continue to slide relative to the hopper since it is slidably attached to the bottom of the hopper by the fasteners or posts 194 which cooperatively engage the corresponding elongated slots 196 on the shutter to facilitate guided sliding motion of the shutter 70 relative to the bottom of the hopper 24. Upon continued sliding, the block and magnet 154, 160 will eventually become disengaged allowing continued sliding of the shutter 70 and ultimately alignment of the aperture 80 with the passage 82.

When removing the hopper from the grinder, the reverse action is taken, such that the hopper will continue to slide upon the pulling force of the user with the shutter 70 retained in position. In this method, the shutter is retained as a result of the block and magnet being engaged by attractive magnetic forces, the block 156 and magnet 158 being engaged as a result of attractive magnetic forces. At a point whereby the hopper 24 has moved relative to the generally fixed shutter 70, the pulling forces of the user will overcome the attractive forces of the magnet and block 158, 156. At this point, the other magnet and block 160, 154 will be generally aligned, thereby facilitating engagement as a result of attractive magnetic forces. When the hopper is removed, the shutter will be positioned over the passage 82 prevent beans from flowing out of the hopper.

As such, the hopper is retained in a normally open position while on the grinder, and a normally closed position when it is removed from the grinder. As can be noted from the above description of the operation of the shutter and the related magnetic devices, the shutter is not electronically controllable or operated. The shutter does not use any devices which work by methods or principles of electronics. In contrast, the shutter operates on mechanical principles and uses magnetic forces associated with permanent magnets which facilitate opening and closing or retaining an open or closed position by use of the combination of magnets and magnetically attractive blocks or components.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods that incorporate one or more of the features of the disclosure and fall within the spirit and scope of the present disclosure.

The invention claimed is:

1. A grinding machine for use in grinding materials, the grinding machine comprising:
   a grinder assembly for receiving material therein;
   at least one removable hopper removably positionable on the grinding assembly for dispensing material to the grinder assembly;
   the removable hopper being positionable on the grinder assembly in a generally non-vertical direction;
   a passage defined in the hopper being cooperatively placed in communication with the grinding assembly for dispensing material from the hopper to the grinder assembly;
   a displaceable shutter carried on the hopper being positionable in an open position when the hopper is on the grinder assembly and being positionable in a closed position when the hopper is removed from the grinder assembly; and
   a slide gate mechanism including a slide gate and a mover linked to the slide gate for controllably opening and closing passage of material from the hopper to the grinder assembly for grinding material therein.

2. The grinding machine of claim 1 comprising:
   a generally open top assembly on the grinder assembly for receiving the hopper thereon; and
   at least one wall of the hopper defining a cavity of the hopper.

3. The grinding machine of claim 1 comprising
   the shutter defining an aperture therethrough being displaceably alignable with the passage for dispensing material therethrough when the hopper is positioned on the grinder assembly to allow passage of coffee beans therethrough.

4. A method of using a grinder assembly and a plurality of food retaining hoppers for selectively grinding food substances, the method comprising the steps of:
   providing a grinder assembly;
   providing a plurality of hoppers for retaining the food substance therein;
   providing a passage in each hopper for dispensing food substance from the hopper to the grinder assembly;
   providing a shutter displaceably carried on each hopper proximate the passage for covering the passage to prevent dispensing of food substance from the hopper when the hopper is removed from the grinder assembly;
   providing an aperture in each shutter that is alignable with the passage for dispensing food substance from the hopper when the hopper is positioned on the grinder assembly;
   selectively placing at least one of the plurality of hoppers on the grinder assembly in a generally non-vertical orientation for dispensing food substance from the hopper for grinding;
   selectively removing a hopper from the grinder assembly in a generally non-vertical orientation; and
   selectively positioning one of the plurality of hoppers on the grinder assembly for dispensing of a different food substance therefrom along a continuously downward flow path to the grinder assembly for grinding.

5. A substance dispensing machine comprising:
   a dispensing control unit for controllably dispensing a quantity of substance;
   at least one substance retaining hopper for retaining a quantity of substance;
   at least one wall of the hopper defining a cavity therein;
   a passage defined in the hopper;
   a shutter operatively carried on the hopper;
   an aperture defined in the shutter for controllable alignment with and displacement away from the passage, alignment of the aperture and passage allowing substance to be dispensed from the hopper to the substance dispensing control unit;
   the hopper being adapted for placement of the hopper on the substance dispensing control unit in a generally non-vertical orientation, and adapted for positioning the aperture in alignment with the passage to provide a continuous downward flow path from the hopper to the dispensing control unit and to provide a normally open condition with the hopper on the substance dispensing control unit; and
   the hopper being adapted for removal of the hopper from the substance dispensing control unit in a generally non-vertical orientation and for displacing of the shutter to move the aperture out of alignment with the passage for covering the passage with a portion of the shutter.

6. The substance dispensing machine of claim 5 wherein the hopper is adapted to move in a generally horizontal direction for placement of the hopper on the substance dispensing control unit.

7. A method of positioning a hopper on a grinder and removing the hopper from the grinder, the method comprising the steps of:
   providing a grinder having an open top assembly;
   providing at least one hopper for containing a food substance;
   providing a shutter displaceably carried on the hopper to prevent dispensing of food substance from the hopper when the hopper is removed from the grinder;
   providing an aperture in the shutter that is alignable with the passage for dispensing food substance from the hopper along a continuous downward flow path to the grinder when the hopper is placed on the grinder;
   selectively positioning the hopper on the open top assembly by moving the hopper in a generally non-vertical orientation; and
   selectively removing a hopper from the grinder in a non-vertical orientation.

8. The method according to claim 7 further comprising the step of moving the hopper in a generally horizontal position to locate the hopper on the open top assembly of the grinder assembly.

9. A grinding machine for controllably dispensing and grinding coffee beans, the grinding machine comprising:
   a grinder assembly;
   at least one hopper for use with the grinder assembly;
   an open top assembly on the grinder assembly for receiving the hopper thereon;
   at least one wall of the hopper defining a cavity of the hopper;
   a passage defined on the hopper for passing coffee beans retained in the cavity to the grinder assembly;
   a shutter displaceably carried on the hopper proximate the passage;

the shutter being positionable in a closed position when the hopper is removed from the grinder assembly;

the shutter defining an aperture therethrough being displaceably alignable with the passage for dispensing coffee beans therethrough when the hopper is positioned on the grinder assembly to allow passage of coffee beans therethrough;

a magnetic assembly operatively associated with the shutter and the hopper for facilitating and retaining the shutter in a configuration with a portion of the shutter covering the passage when the hopper is removed from the grinder assembly.

10. A grinding machine for use in grinding materials, the grinding machine comprising:

a grinder assembly for receiving material therein;

at least one removable hopper attachable proximate to the grinder assembly for dispensing material to the grinder assembly;

a passage defined in the hopper being cooperatively positionable in communication with the grinder assembly for dispensing material from the hopper to the grinder assembly;

a displaceable shutter carried on the hopper and being positionable in an open position when the hopper is placed on the grinder assembly and being positionable in a closed position when the hopper is removed from the grinder assembly; and a slide gate mechanism carried on the grinder assembly including a slide gate and a mover linked to the slide gate for controllably opening and closing passage of material from the hopper to the grinder assembly for grinding material therein.

11. A grinding machine of claim 10, the grinder machine further comprising:

a component carried on the hopper for retaining information;

a reader provided on the grinder assembly positioned for reading information from the component carried on the hopper;

a controller receiving information from the component by use of the reader.

12. The grinding machine of claim 10 comprising:

a magnetic assembly operatively associated with the shutter and the hopper for facilitating and retaining the shutter in a configuration with a portion of the shutter covering the passage when the hopper is removed from the grinder assembly.

13. The grinding machine of claim 10 comprising:

a generally open top assembly on the grinder assembly for receiving the hopper thereon; and at least one wall of the hopper defining a cavity of the hopper.

14. The grinding machine of claim 10, wherein:

the shutter defines an aperture therethrough being displaceably alignable with the passage for dispensing material therethrough when the hopper is positioned on the grinder assembly, the aperture of the shutter and the passage of the hopper being aligned to an open position to allow passage of coffee beans therethrough when the hopper is placed on the grinder.

15. A method of grinding material, the method comprising the steps of:

providing a grinder assembly;
providing at least one hopper;
providing a passage defined on the hopper for dispensing material therethrough;
providing a shutter on the hopper;
providing an aperture defined in the shutter;
positioning the hopper on the grinder assembly;
shifting the shutter from a closed position to an open position;
aligning the aperture with the passage when placing the hopper on the grinder assembly;
further comprising the steps of:
providing a slide gate mechanism on the grinder assembly; and
controllably operating the slide gate for opening and closing passage of material from the hopper to the grinder assembly for grinding material therein.

16. A method of grinding material according to claim 15, wherein the material to be ground is a food substance, the step of providing at least one hopper comprises providing a plurality of hoppers for retaining the food substance therein;

the step of providing a shutter on the hopper comprises providing a shutter displaceably attached to one of the hoppers proximate the passage for covering the passage to prevent dispensing of food substance from the hopper when the hopper is removed from the grinder assembly;

the step of providing an aperture defined in the shutter comprises providing an aperture in the shutter that is alignable with the passage for dispensing food substance from the hopper when the hopper is placed on the grinder assembly;

the method further comprising selectively placing one of the plurality of hoppers on the grinder assembly for dispensing food substance from the hopper for grinding;

selectively removing said one hopper from the grinder assembly; and selectively placing another of the plurality of hoppers on the grinder assembly for dispensing of a different food substance therefrom to the grinder assembly for grinding.

17. A dispensing machine for dispensing beverage producing substances or food products comprising:

a dispensing control unit for controllably dispensing a quantity of substance;

at least one substance retaining hopper for retaining a quantity of substance;

at least one wall of the hopper defining a cavity therein;

a passage defined in the hopper;

a shutter operatively attached to the hopper;

an aperture defined in the shutter for alignment with and displacement away from the passage, alignment of the aperture and passage allowing substance to be dispensed from the hopper to the substance dispensing control unit;

wherein the hopper is arranged on the substance dispensing control unit so as to position the aperture in alignment with the passage to provide a normally open condition with the hopper on the substance dispensing control unit and to provide a continuous downward flow path from the hopper to the dispensing control unit;

wherein removal of the hopper from the substance dispensing control unit displaces the shutter to move the aperture out of alignment with the passage so as to cover the passage with a portion of the shutter;

a slide gate mechanism provided in the dispensing control unit;

wherein the slide gate is operable for opening and closing passage of material from the hopper to the substance dispensing control unit.

18. A method of positioning a hopper on a grinder and removing the hopper from the grinder, the method comprising the steps of:

providing a grinder assembly having an open top assembly;
providing a slide gate mechanism on the grinder assembly;
providing at least one hopper;
positioning the hopper on the open top assembly by moving the hopper in a non-vertical position;
positioning a passage defined in the hopper in communication with the grinder for dispensing material from the hopper to the grinder assembly;
positioning a displaceable shutter carried on the hopper in an open position when the hopper is positioned on the grinder and being positionable in a closed position when the hopper is removed from the grinder; and
controllably opening and closing the slide gate mechanism including a slide gate and a mover linked to the slide gate.

19. The method according to claim 18, further comprising the step of moving the hopper in a generally horizontal position to locate the hopper on the open top assembly of the grinder assembly.

* * * * *